US010700633B2

(12) United States Patent
DeBartolo, III et al.

(10) Patent No.: US 10,700,633 B2
(45) Date of Patent: Jun. 30, 2020

(54) PROTECTION OF ELECTRICAL COMPONENTS IN SOLAR ENERGY SHADE STRUCTURE

(71) Applicant: Strategic Solar Energy, LLC, Scottsdale, AZ (US)

(72) Inventors: Jack DeBartolo, III, Phoenix, AZ (US); Robert Boscamp, Tempe, AZ (US); Thomas Headley, Scottsdale, AZ (US); Michael Nothum, Jr., Tempe, AZ (US)

(73) Assignee: Strategic Solar Energy, LLC, Scottsdale, AZ (US)

( * ) Notice: Subject to any disclaimer, the term of this patent is extended or adjusted under 35 U.S.C. 154(b) by 0 days.

(21) Appl. No.: 15/721,585

(22) Filed: Sep. 29, 2017

(65) Prior Publication Data

US 2018/0041159 A1 Feb. 8, 2018

Related U.S. Application Data

(63) Continuation-in-part of application No. 15/094,760, filed on Apr. 8, 2016, now Pat. No. 10,277,160, (Continued)

(51) Int. Cl.
*H02S 20/23* (2014.01)
*G06Q 90/00* (2006.01)
(Continued)

(52) U.S. Cl.
CPC ............. *H02S 20/23* (2014.12); *E04F 10/08* (2013.01); *E04H 6/025* (2013.01); *F24S 20/67* (2018.05);
(Continued)

(58) Field of Classification Search
CPC . E04F 10/08; E04H 6/025; F24S 20/67; F24S 25/00; F24S 25/13; G06Q 30/00;
(Continued)

(56) References Cited

U.S. PATENT DOCUMENTS 1,822,909 A * 9/1931 Schneider ............... F24D 19/06
52/507
3,309,119 A * 3/1967 Phillips ................... E04C 2/428
403/384

(Continued)

FOREIGN PATENT DOCUMENTS

WO 2018064635 4/2018

OTHER PUBLICATIONS

USPTO; Requirement for Restriction dated May 30, 2013 in U.S. Appl. No. 13/185,190.
(Continued)

*Primary Examiner* — James M Ference
(74) *Attorney, Agent, or Firm* — Snell & Wilmer L.L.P.

(57) ABSTRACT

In accordance with various exemplary embodiments, solar energy shade structures and support systems are disclosed that have electrical components concealed or screened within columns located under the structure. For example, a solar energy structure may comprise: a solar panel support structure, a plurality of solar panels supported by the solar panel support structure, a plurality of vertical supports connected to the solar panel support structure for supporting the solar panel support structure elevated above a surface, and a column, located under the solar panel support structure. The column comprises an electrical component mounted to the column in a screened manner, wherein the electrical component comprises at least one of a string inverter, a combiner, and a battery.

10 Claims, 19 Drawing Sheets

US 10,700,633 B2
Page 2

Related U.S. Application Data which is a continuation of application No. 14/472,876, filed on Aug. 29, 2014, now Pat. No. 9,335,069, which is a continuation of application No. 13/185,190, filed on Jul. 18, 2011, now Pat. No. 8,825,500.

(60) Provisional application No. 62/401,735, filed on Sep. 29, 2016, provisional application No. 61/399,728, filed on Jul. 16, 2010.

(51) Int. Cl.

| | | |
|---|---|---|
| *E04F 10/08* | (2006.01) | |
| *G06Q 99/00* | (2006.01) | |
| *G06Q 30/00* | (2012.01) | |
| *E04H 6/02* | (2006.01) | |
| *F24S 25/00* | (2018.01) | |
| *H02S 20/10* | (2014.01) | |
| *F24S 25/13* | (2018.01) | |
| *F24S 20/67* | (2018.01) | |
| *G06Q 30/02* | (2012.01) | |
| *H02S 40/32* | (2014.01) | |
| *H02S 20/26* | (2014.01) | |

(52) U.S. Cl.
CPC ............ *F24S 25/00* (2018.05); *F24S 25/13* (2018.05); *G06Q 30/00* (2013.01); *G06Q 30/0241* (2013.01); *G06Q 90/00* (2013.01); *G06Q 99/00* (2013.01); *H02S 20/10* (2014.12); *H02S 20/26* (2014.12); *H02S 40/32* (2014.12); *Y02B 10/12* (2013.01); *Y02B 10/14* (2013.01); *Y02B 10/20* (2013.01); *Y02E 10/44* (2013.01); *Y02E 10/47* (2013.01); *Y02E 10/50* (2013.01); *Y04S 10/58* (2013.01); *Y10S 136/291* (2013.01)

(58) Field of Classification Search
CPC .... G06Q 30/0241; G06Q 90/00; G06Q 99/00; H02S 20/10; H02S 20/23; H02S 20/26; H02S 40/32; Y02B 10/12; Y02B 10/14; Y02B 10/20; Y02B 10/44; Y02B 10/47; Y02B 10/50; Y02B 10/58; Y02S 136/291
See application file for complete search history.

(56) References Cited

U.S. PATENT DOCUMENTS

| | | | | |
|---|---|---|---|---|
| 3,367,078 A | * | 2/1968 | Thompson, Jr. | E04F 13/045 52/507 |
| 3,413,775 A | * | 12/1968 | Katz | E04F 13/0885 52/834 |
| 3,959,946 A | * | 6/1976 | Holmes | E04H 12/003 52/845 |
| 4,421,943 A | * | 12/1983 | Withjack | H02S 20/30 136/246 |
| 4,467,584 A | * | 8/1984 | Crites | E04F 13/0733 52/489.1 |
| 4,656,792 A | * | 4/1987 | Clark | E04C 3/42 52/642 |
| 5,107,637 A | * | 4/1992 | Robbins | E04H 1/1211 136/291 |
| 5,109,643 A | * | 5/1992 | Speers | E04B 7/00 52/220.3 |
| 5,125,608 A | * | 6/1992 | McMaster | H02S 20/10 248/163.1 |
| 5,131,955 A | * | 7/1992 | Stern | B64G 1/443 136/245 |
| 5,212,916 A | * | 5/1993 | Dippel | E04B 7/14 52/82 |
| 5,261,435 A | * | 11/1993 | Stanley | E04H 6/04 135/90 |
| 5,279,085 A | | 1/1994 | DiPaolo et al. | |
| 5,335,471 A | * | 8/1994 | Kupiec | E01F 15/003 248/218.4 |
| 5,478,407 A | * | 12/1995 | Dorison | E04B 7/14 136/244 |
| 5,533,306 A | * | 7/1996 | Aspenson | E04B 9/006 52/144 |
| 5,630,297 A | * | 5/1997 | Rutherford | E04B 1/66 52/371 |
| 5,847,537 A | * | 12/1998 | Parmley, Sr. | B60L 8/003 320/109 |
| 5,881,528 A | * | 3/1999 | Grewe | E04C 3/30 52/831 |
| D408,554 S | * | 4/1999 | Dinwoodie | D25/35 |
| 5,956,920 A | * | 9/1999 | Davis | E04C 3/30 52/236.1 |
| 6,009,683 A | * | 1/2000 | Grewe | E04C 3/30 52/301 |
| 6,044,594 A | * | 4/2000 | Desselle | E04B 1/7053 52/101 |
| 6,073,413 A | * | 6/2000 | Tongiatama | E04B 1/26 52/693 |
| 6,176,048 B1 | * | 1/2001 | Berger | E04B 1/70 52/101 |
| 6,185,898 B1 | * | 2/2001 | Pratt | E04B 1/26 52/657 |
| 6,308,469 B1 | * | 10/2001 | Leung | E04B 1/10 411/466 |
| 6,378,810 B1 | * | 4/2002 | Pham | B64G 1/10 244/158.5 |
| 6,421,966 B1 | * | 7/2002 | Braunstein | E04F 10/08 136/244 |
| 6,590,363 B2 | * | 7/2003 | Teramoto | F03D 1/04 320/101 |
| 6,722,357 B2 | | 4/2004 | Shingleton et al. | |
| 6,886,895 B2 | * | 5/2005 | Previte | A47B 47/02 312/213 |
| 6,930,237 B2 | * | 8/2005 | Mattiuzzo | F24S 30/40 136/251 |
| 7,252,083 B2 | | 8/2007 | Hayden | |
| 7,435,897 B2 | | 10/2008 | Russell | |
| 7,531,741 B1 | * | 5/2009 | Melton | H02S 20/32 136/246 |
| 7,647,924 B2 | | 1/2010 | Hayden | |
| D611,404 S | * | 3/2010 | Mackler | D13/102 |
| D611,405 S | * | 3/2010 | Mackler | D13/102 |
| D643,937 S | * | 8/2011 | Boesch | D25/56 |
| 8,013,569 B2 | | 9/2011 | Hartman | |
| D657,736 S | * | 4/2012 | Mackler | D13/102 |
| D657,737 S | * | 4/2012 | Mackler | D13/102 |
| D657,738 S | * | 4/2012 | Mackler | D13/102 |
| D664,916 S | * | 8/2012 | Conger | F24S 25/50 D13/102 |
| 8,276,328 B2 | * | 10/2012 | Pepin | E04B 1/3483 52/167.3 |
| 8,294,022 B2 | | 10/2012 | Lenox | |
| D672,472 S | * | 12/2012 | Dolceamore | F24S 25/12 D25/22 |
| 8,402,704 B2 | | 3/2013 | Hartley | |
| 8,464,496 B2 | | 6/2013 | Cusson et al. | |
| 8,511,007 B2 | * | 8/2013 | Powers, III | E04F 10/08 52/173.3 |
| 8,650,812 B2 | * | 2/2014 | Cusson | H02S 20/30 52/173.3 |
| 8,776,454 B2 | | 7/2014 | Zuritis | |
| 8,825,500 B2 | | 9/2014 | DeBartolo, III et al. | |
| 9,335,069 B2 | | 5/2016 | DeBartolo, III et al. | |
| 9,369,083 B2 | | 6/2016 | Lou | |
| 10,044,319 B2 | | 8/2018 | Zante | H02S 20/23 |
| 10,277,160 B2 | | 4/2019 | DeBartolo, III et al. | |
| 2002/0095896 A1 | * | 7/2002 | Commins | E04B 1/10 52/483.1 |
| 2002/0108332 A1 | * | 8/2002 | Timmerman, Sr. | E04B 1/0007 52/293.3 |
| 2003/0009964 A1 | * | 1/2003 | Trarup | E02D 27/32 52/295 |

(56) References Cited

U.S. PATENT DOCUMENTS

| | | | |
|---|---|---|---|
| 2003/0034029 A1* | 2/2003 | Shingleton | F24S 30/425 126/600 |
| 2003/0042371 A1* | 3/2003 | McCahill | E04C 3/02 248/57 |
| 2003/0177706 A1 | 9/2003 | Ullman | |
| 2003/0205008 A1* | 11/2003 | Sridhara | E04H 9/02 52/167.3 |
| 2004/0025931 A1* | 2/2004 | Aguglia | F24S 10/17 136/246 |
| 2004/0065025 A1* | 4/2004 | Durham | E04B 1/3416 52/73 |
| 2004/0261955 A1* | 12/2004 | Shingleton | F24S 20/67 160/84.06 |
| 2005/0035244 A1* | 2/2005 | Conger | F24S 25/50 248/49 |
| 2005/0109384 A1 | 5/2005 | Shingleton et al. | |
| 2005/0174762 A1* | 8/2005 | Fogerlie | F21S 8/086 362/183 |
| 2005/0227556 A1* | 10/2005 | Robertson | B01D 29/012 442/5 |
| 2005/0241246 A1* | 11/2005 | Sinha | H02S 20/23 52/173.3 |
| 2005/0274060 A1* | 12/2005 | Lederle | A01M 1/24 43/132.1 |
| 2006/0010824 A1* | 1/2006 | Waters | E04C 3/30 52/834 |
| 2006/0054162 A1* | 3/2006 | Romeo | G01S 3/7861 126/600 |
| 2006/0090788 A1* | 5/2006 | Oak | H02S 20/10 136/244 |
| 2006/0090858 A1* | 5/2006 | Heidenreich | E04F 10/0648 160/68 |
| 2007/0188483 A1* | 8/2007 | Bonner | G09F 9/30 345/204 |
| 2008/0216418 A1* | 9/2008 | Durham | E04H 6/025 52/73 |
| 2008/0257402 A1* | 10/2008 | Kamp | H02S 20/23 136/251 |
| 2008/0283112 A1* | 11/2008 | Conger | H02S 20/10 136/244 |
| 2008/0283113 A1* | 11/2008 | Conger | H02S 20/10 136/244 |
| 2009/0031663 A1* | 2/2009 | White | E04H 15/34 52/653.1 |
| 2009/0038672 A1* | 2/2009 | Conger | H02S 20/10 136/244 |
| 2009/0045628 A1* | 2/2009 | Erdman | F03D 80/60 290/44 |
| 2009/0050194 A1* | 2/2009 | Noble | E04B 7/12 136/251 |
| 2009/0094909 A1* | 4/2009 | Cantrell | E04C 2/38 52/202 |
| 2009/0194669 A1* | 8/2009 | Noble | G01S 3/7861 250/203.4 |
| 2009/0199846 A1 | 8/2009 | Collins et al. | |
| 2009/0229200 A1* | 9/2009 | Noble | E04H 12/2261 52/169.13 |
| 2009/0308434 A1 | 12/2009 | Franceschini | |
| 2010/0000165 A1* | 1/2010 | Koller | A01G 9/243 52/173.3 |
| 2010/0000596 A1* | 1/2010 | Mackler | G09F 11/025 136/246 |
| 2010/0043781 A1* | 2/2010 | Jones | F24S 25/65 126/704 |
| 2010/0089433 A1* | 4/2010 | Conger | F24S 25/50 136/244 |
| 2010/0101559 A1* | 4/2010 | Grant | H02S 20/32 126/600 |
| 2010/0108113 A1* | 5/2010 | Taggart | E04F 10/08 135/96 |
| 2010/0132769 A1* | 6/2010 | Potter | E04H 6/025 136/251 |
| 2010/0139645 A1* | 6/2010 | Whipple | H02S 20/24 126/576 |
| 2010/0175741 A1* | 7/2010 | Thorne | H02S 20/32 136/251 |
| 2010/0193013 A1* | 8/2010 | Kong | H02S 20/30 136/251 |
| 2010/0214129 A1* | 8/2010 | Brualla Marti | G09F 19/22 340/944 |
| 2010/0225266 A1* | 9/2010 | Hartman | B60L 11/1825 320/101 |
| 2010/0236183 A1* | 9/2010 | Cusson | H02S 20/24 52/645 |
| 2010/0252092 A1* | 10/2010 | Lenox | F24S 25/60 136/251 |
| 2010/0258110 A1* | 10/2010 | Krabbe | F24S 30/455 126/605 |
| 2010/0263660 A1* | 10/2010 | Thorne | H02S 20/22 126/601 |
| 2010/0275975 A1* | 11/2010 | Monschke | F24S 25/35 136/251 |
| 2010/0308596 A1* | 12/2010 | Gawrisch | E04H 12/003 290/55 |
| 2010/0314509 A1* | 12/2010 | Conger | E04C 3/30 248/121 |
| 2011/0023931 A1* | 2/2011 | Chen | F24S 25/10 136/244 |
| 2011/0030285 A1* | 2/2011 | Kaufman | E04H 6/025 52/82 |
| 2011/0072742 A1 | 3/2011 | Beck | |
| 2011/0073161 A1* | 3/2011 | Scanlon | H02S 20/32 136/246 |
| 2011/0094559 A1* | 4/2011 | Potter | H02S 20/10 136/244 |
| 2011/0094569 A1* | 4/2011 | Hartley | E04H 6/025 136/251 |
| 2011/0113705 A1* | 5/2011 | Raczkowski | E01C 1/002 52/173.3 |
| 2011/0131896 A1* | 6/2011 | Hansen | E04B 1/24 52/167.3 |
| 2011/0133689 A1* | 6/2011 | Uchihashi | H02J 7/00 320/101 |
| 2011/0141719 A1* | 6/2011 | Ogura | F21S 8/086 362/183 |
| 2011/0174748 A1* | 7/2011 | Civit Vidal | H02S 20/23 211/1.51 |
| 2011/0221203 A1* | 9/2011 | Miller | F03D 9/007 290/55 |
| 2011/0277809 A1* | 11/2011 | Dalland | H02S 20/10 136/244 |
| 2011/0290305 A1* | 12/2011 | Hoffmann | H02S 20/23 136/251 |
| 2012/0016815 A1* | 1/2012 | DeBartolo, III | E04H 6/025 705/500 |
| 2012/0031456 A1* | 2/2012 | Christman | H02S 20/10 136/244 |
| 2012/0073219 A1* | 3/2012 | Zuritis | F24S 25/65 52/173.3 |
| 2012/0073565 A1 | 3/2012 | Grant et al. | |
| 2012/0131866 A1* | 5/2012 | Batut | E04H 6/025 52/173.3 |
| 2012/0167960 A1* | 7/2012 | Scorsone | H02S 20/10 136/251 |
| 2012/0181973 A1* | 7/2012 | Lyden | H02J 3/383 320/101 |
| 2012/0291374 A1* | 11/2012 | Zante | F24S 25/70 52/173.3 |
| 2013/0076294 A1* | 3/2013 | Smith | H01M 10/465 320/101 |
| 2013/0229141 A1 | 9/2013 | Johnson | |
| 2014/0077055 A1* | 3/2014 | Hamilton | H02S 20/10 248/560 |
| 2014/0223844 A1 | 8/2014 | Lou | |
| 2014/0366466 A1 | 12/2014 | DeBartolo, III et al. | |
| 2015/0075588 A1* | 3/2015 | Franklin | H02S 40/32 136/251 |
| 2016/0190974 A1 | 6/2016 | Dickey et al. | |

(56) References Cited

U.S. PATENT DOCUMENTS

2016/0365826 A1   12/2016   DeBartolo, III et al.
2017/0298615 A1*  10/2017   Janabi ................. E04B 1/34384
2018/0041159 A1*   2/2018   DeBartolo, III ........ H02S 20/26
2018/0048260 A1*   2/2018   Ludwig ................... H02S 30/10

OTHER PUBLICATIONS

USPTO; Non-Final Office Action dated Aug. 23, 2013 in U.S. Appl. No. 13/185,190.
USPTO; Final Office Action dated Feb. 20, 2014 in U.S. Appl. No. 13/185,190.
USPTO; Notice of Allowance dated May 5, 2014 in U.S. Appl. No. 13/185,190.
USPTO; Requirement for Restriction dated Feb. 3, 2015 in U.S. Appl. No. 14/472,876.
USPTO; Non-Final Office Action dated Apr. 17, 2015 in U.S. Appl. No. 14/472,876.
USPTO; Final Office Action dated Dec. 9, 2015 in U.S. Appl. No. 14/472,876.
USPTO; Notice of Allowance dated Apr. 6, 2016 in U.S. Appl. No. 14/472,876.
USPTO; Requirement for Restriction dated Dec. 19, 2016 in U.S. Appl. No. 15/094,760.
USPTO; Non-Final Office Action dated Apr. 5, 2017 in U.S. Appl. No. 15/094,760.
USPTO; Final Office Action dated Oct. 12, 2017 in U.S. Appl. No. 15/094,760.
PCT; International Search Report dated Dec. 22, 2017 in Application No. PCT/US2017/054615.
PCT; Written Opinion of the International Searching Authority dated Dec. 22, 2017 in Application No. PCT/US2017/054615.
Parking Structure 1-apache Blvd.] Business and Finance, printed from https://cfo,asu.edu/solar-apache on Dec. 9, 2016 alleging Jan. 2009 commissioned dated, pp. 1-2.
Parking Structure 5-Stadium Dr.] Business and Finance, printed from https://cfo.asu.edu/solar-stadium on Dec. 9, 2016 alleging Dec. 2008 commissioned dated, pp. 1-2.
SunPower Corporation, Case Study for Foothill-De Anza College District, printed from https://us.sunpower.com/commercial-solar/case-studies/deanza-college/ alleging Apr. 2005 completion dated for the parking system constructed at De Anza College, pp. 1-2.
Strategic Solar Energy LLC, Complaint against Affordable Solar Installation, Inc., Dec. 29, 2016, 30 Pages.
Underground Carpenter publication, http://undergroundcarpenter.blogspot.com/2009/04/springs-preserve-in-las-vegas-nevada.html, Apr. 5, 2009, (accessed Oct. 4, 2017).
Green Energy vs Actual "Green" Energy, http://www.basinandrangewatch,org/SolarDesert.html, Nov. 1, 2008, (accessed Oct. 4, 2017).
International Preliminary Report on Patentability in the International Application No. PCT/US2017/054615 dated Apr. 2, 2019.
Non-Final Office Action dated Apr. 26, 2018 in U.S. Appl. No. 15/094,760.
Notice of Allowance dated Dec. 11, 2018 in U.S. Appl. No. 15/094,760.
Gibson, "Capturing the Desert Sun," Progressive Engineer Feature, 5 Pages, (2008).
Springs Preserve, Photograph Taken Jul. 29, 2008, https://www.flickr.com/photos/stuartwildlife/2760960352/in/phtotstream, (2008).
Working Railway Station, Photograph Taken Dec. 3, 2009, https://www.flickr.com/photos/nickhi/4155715767, (2009).
USPTO; Non-Final Office Action dated Feb. 6, 2020 in the U.S. Appl. No. 16/367,145.
PCT; International Search Report and Written Opinion dated Jun. 24, 2019 in Application No. PCT/US2019/24432.
USTPO; Non-Final Office Action dated Jul. 30, 2019 in the U.S. Appl. No. 16/368,481.
USPTO; Notice of Allowance dated Feb. 27, 2020 in the U.S. Appl. No. 16/368,481.

* cited by examiner

PROTECTION OF ELECTRICAL COMPONENTS IN SOLAR ENERGY SHADE STRUCTURE

CROSS-REFERENCE TO RELATED APPLICATIONS

This application claims priority to U.S. Provisional Application No. 62/401,735, filed Sep. 29, 2016, entitled "Protection of Electrical Components in Solar Energy Shade Structure," and is a continuation-in-part of U.S. application Ser. No. 15/094,760, filed Apr. 8, 2016, entitled "Solar Energy Shade Structure," which is a continuation of U.S. application Ser. No. 14/472,876, filed Aug. 29, 2014, entitled "Solar Energy Collecting Systems and Methods," which is a continuation of U.S. application Ser. No. 13/185,190, filed Jul. 18, 2011, entitled "Solar Energy Collecting Systems and Methods," and claims priority to U.S. Provisional Application No. 61/399,728, filed Jul. 16, 2010, entitled "Solar Energy Collecting Shade Structure," which are all herein incorporated by reference in their entirety.

FIELD OF INVENTION

The present disclosure generally relates to apparatus, systems and methods for collecting solar energy and relates more specifically to locating electrical components, such as, for example, string inverters, within columns of a solar energy shade structure.

BACKGROUND OF THE INVENTION

There is an unsolved need to collect large amounts of solar energy without causing a large negative impact to the local environment where the energy is collected. Some current solar energy collection technologies collect energy for personal use by mounting photovoltaic solar panels on the rooftops of homes or other buildings. These technologies are fine for personal use but they are restricted to collecting relatively small amounts of energy (50 kilowatts or less). Other current solar energy collection technologies collect large amounts of solar energy (one megawatt to several hundred megawatts) by converting large tracts of land into solar farms. These large installations make a major negative environmental impact on the land they occupy. In addition, large installations require the energy they generate to be transported to the cities where it is needed via new transmission lines. These new transmission lines are costly and have a further negative impact on the environment.

What is needed is a means to collect large amounts of solar energy in cities where the energy is used in a manner that improves and beautifies the local environment and has positive environmental externalities.

A second unsolved problem in the areas of the world which have intense sunshine is that many public and private open spaces are underutilized because the sun makes it uncomfortable for people to use those spaces during much of the year. It is too expensive to provide large amounts of shade for those areas. Additionally, many of the plants native to those areas would thrive in the shade if it could be provided.

What is needed is a cost effective means to provide shade for large public and private open spaces to make the spaces more comfortable for people to use. Furthermore, the shade should be provided in a manner that allows plants to flourish.

A third unsolved problem is that the large parking lots in cities with intense sunshine absorb large amounts of heat from the sun and then later reemit that heat. This absorbing and reemitting of heat is known as the heat island effect and makes the cities hotter during the day and hotter longer into the evening. Examples are large asphalt or concrete parking lots such as are typically found near shopping centers and large business areas.

What is needed is a cost effective means to reduce the heat absorbed by the large asphalt parking lots from the sun and thereby reduce the heat island effect in cities with intense sunshine.

A fourth unsolved problem is a way to minimize the area required to collect solar energy. Typically, once solar is installed on a tract of land the land cannot be used for anything else or has only limited uses. The land is generally fully occupied by being a solar collection facility. Further when the solar panels are placed near the ground, access roads and paths must be created consuming additional land area. Also, the placement of central inverters and other necessary transmission equipment takes up even more land. Finally the solar panels generally need to be set back away from nearby tall objects such as trees, fences or buildings on adjacent land in order to function efficiently.

What is needed are systems, methods and structures for minimizing the amount of land required to collect solar energy and further what is needed are systems, methods and structures for allowing the land dedicated to collecting solar energy to be simultaneously used for other purposes.

A fifth unsolved problem is the cost of solar energy. Simply put solar energy costs much more to produce than tradition methods of generating electricity. Thus, a means is needed to reduce or offset the cost of solar energy produced.

Moreover, a sixth unsolved problem is the need to protect electrical components (associated with solar energy generation) from people and people from those electrical components, while also facilitating convenient access to the electrical components for maintenance. There is also a need for more efficient distribution of the power generated by the solar energy structures.

SUMMARY OF THE INVENTION

In accordance with an example embodiment, a solar panel assembly vertical support structure comprises: a force lateral brace-frame having a first height in a direction parallel to a vertical direction and a first long axis parallel to an X direction perpendicular to the vertical direction and a first width along the first long axis and a first thickness parallel to a Y direction, wherein the Y direction is perpendicular to both the vertical direction and the X direction, wherein the first width is greater than the first thickness, the force lateral brace-frame for counteracting lateral forces parallel to the X direction to create lateral stability. In this example embodiment, the force lateral brace-frame comprises a main column member, the force lateral brace-frame comprises a component mounting frame, and the force lateral brace-frame further comprises an electrical component coupled to the component mounting frame in a screened manner. In this example embodiment, the force lateral brace-frame comprises a first cladding support coupled to a front face of the force lateral brace-frame, a second cladding support coupled to a rear face of the force lateral brace-frame, a first cladding coupled to the first cladding support and a second cladding coupled to the second cladding support.

In another example embodiment, a solar energy shade structure comprises: a solar panel holding structure configured to support and retain a plurality of solar panels, a force lateral brace-frame configured to hold the solar panel holding structure above a surface and comprising a first cladding support coupled to a front face of the force lateral brace-frame, a second cladding support coupled to a rear face of the force lateral brace-frame, and a first cladding coupled to the first cladding support and a second cladding coupled to the second cladding support. In this example embodiment, the solar energy shade structure further comprises an electrical component mounted in a screened manner to the force lateral brace-frame; and a retaining mechanism. The retaining mechanism may be configured to attach a solar panel of the plurality of solar panels to the solar panel holding structure, wherein the retaining mechanism is accessible from underneath the solar panel for attaching and detaching solar panels.

In another example embodiment, a force lateral brace-frame for supporting a solar panel holding structure comprises: a first height in a direction parallel to a vertical direction, a first long axis parallel to an X direction and perpendicular to the vertical direction, a first width along the first long axis, and a first thickness parallel to a Y direction, wherein the Y direction is perpendicular to both the vertical direction and the X direction, wherein the first width is greater than the first thickness, the force lateral brace-frame for counteracting lateral forces parallel to the X direction to create lateral stability. In this example embodiment, the force lateral brace-frame comprises a main support of the force lateral brace-frame, a front cladding support coupled to the main support and a rear cladding support coupled to the main support, a first cladding coupled to the front cladding support and a second cladding coupled to the rear cladding support, a first side enclosure panel adjacent to and positioned between the front cladding support and the rear cladding support and a second side enclosure panel adjacent to and positioned between the front cladding support and the rear cladding support and positioned opposite the first side enclosure panel, and an electrical component coupled to the force lateral brace-frame.

In another example embodiment, a solar energy structure, comprises: a solar panel support structure, a plurality of solar panels supported by the solar panel support structure, a plurality of vertical supports connected to the solar panel support structure for supporting the solar panel support structure elevated above a surface, and a column, located under the solar panel support structure, comprising an electrical component mounted to the column in a screened manner, wherein the electrical component comprises at least one of a string inverter, a combiner, and a battery.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and where:

FIG. 6A is a photograph of an example shade profile of a tree branch;

FIG. 6B is an example pixilation of the photograph of the shade profile of a tree branch;

FIG. 6C illustrates an adjustment of the example pixilation of the photograph of the shade profile of a tree branch;

FIG. 6D illustrates a further adjustment of the example pixilation of the photograph of the shade profile of a tree branch corresponding to a design plan for an arrangement of solar panels;

DETAILED DESCRIPTION

Figure 1:
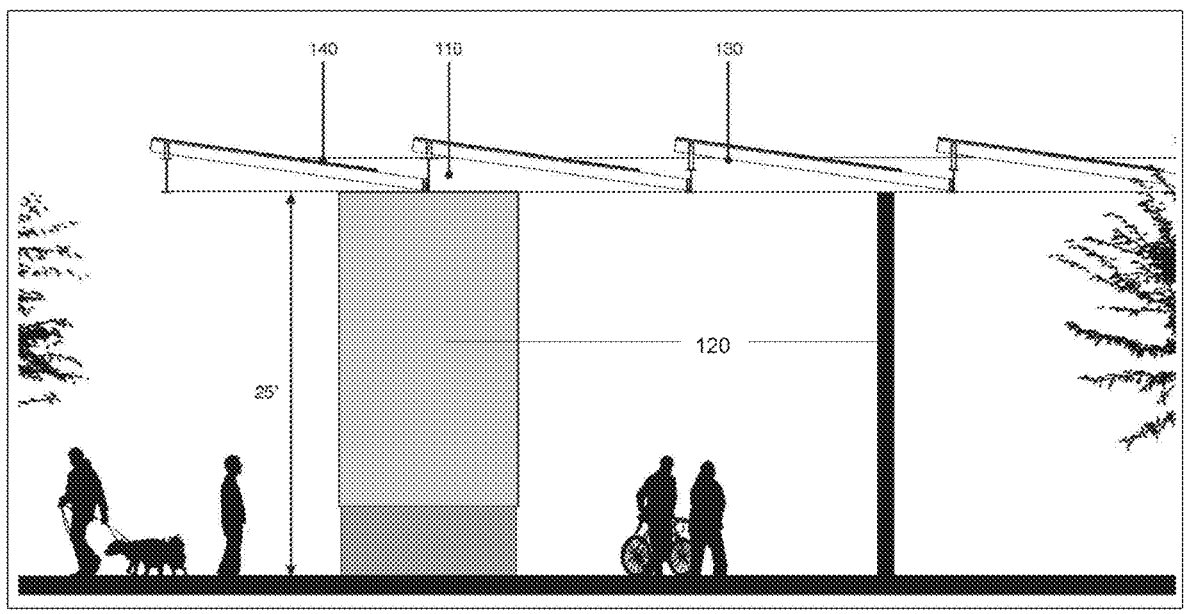
FIG. 1 illustrates an exemplary solar energy collecting shade structure showing people, a car (not shown) and a tree under the structure.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a modular structure.

In an exemplary embodiment, a structure comprises minimal structural support components supporting a solar panel holding structure capable of supporting a wide variety of solar energy collection panels above the ground. The structure may further comprise columns located under the solar panel holding structure for enclosing electrical components associated with the solar panels. The structure may be installed in public or private areas including, for example, parking lots, parks, walkways, driving lanes, playgrounds, outdoor markets, sport viewing areas, performing arts areas, and other public or private areas. Moreover, these structures may be configured to be at least 18 feet tall. The structures may also be configured to allow dappled light to hit the ground, which may provide direct sunlight for vegetation and other features located under the structures.

In an exemplary embodiment and with reference to FIG. 1, a modular structure 100 comprises a solar panel holding structure 110 (hereinafter "SPHS 110") and one or more vertical supports 120. In an embodiment, SPHS 110 is mounted to and supported by one or more vertical supports 120. Modular structure 100 may further comprise one or more solar collection panels 130 and one or more shade panels 140. In an embodiment, one or more solar collection panels 130 are installed in SPHS 110. Similarly, one or more shade panels 140 may be installed in SPHS 110.

In an exemplary embodiment, vertical support 120 may be any structure suitable for supporting a shade structure and/or solar panels 130. In an embodiment, vertical support 120 is taller than a conventional vertical support for a shade structure. For example, in one embodiment, vertical support 120 may be approximately 18 feet to approximately 30 feet tall between the ground and the bottom of the solar panel holding structure 110. In another embodiment, vertical support 120 may be approximately 22 feet to approximately 30 feet tall. In yet another embodiment, vertical support 120 may be approximately 25 feet to approximately 30 feet tall. In still another embodiment, vertical support 120 is approximately 25 feet tall between the ground and the bottom of the solar panel holding structure 110. The increased height of vertical support 120 provides greater visibility. For example, the increased height of vertical support 120 allows for security cameras to be placed beneath the SPHS 110. This configuration allows security cameras to effectively monitor, while being positioned high enough from public spaces to avoid, vandalism, tampering, or an adverse impact on the environment. The increased height of vertical support also provides other advantages. For example, the increased height positions solar collection panels 130 further away from the ground which results in an increase in cooling airflow. This cooling airflow causes solar collection panels 130 to operate more efficiently by maintaining a cooler operating temperature. Also, the increased height reduces the likelihood of adjacent objects of structures shading the solar panels.

In another embodiment, the increased height of vertical support 120 facilitates planting trees, vegetation, and placing structures underneath modular structure 100. For example, large trees and other types of vegetation that are less than 18 feet tall may be included under the structure. These trees and/or vegetation may be strategically placed under modular structure 100 so that they receive sunlight that is allowed to pass through modular structure 100. Moreover, the ability to include trees and vegetation provides cooling and environmental ambiance not possible to obtain if the structure does not permit such vegetation due to its low clearance.

In an exemplary embodiment, solar collection panel 130 is any device or apparatus configured to receive sunlight and generate electricity. Moreover, solar collection panel 130 may also provide shade. In one embodiment, solar collection panel 130 is a photovoltaic solar panel. Solar collection panel 130 may be of any suitable size, including for example, a 6.4 foot by 3.25 foot panel. In an example embodiment, the solar collection panel 130 is a glass-glass photovoltaic module.

In an exemplary embodiment, shade panel 140 may be any device or apparatus configured to provide shade. Shade panel 140 may be made of any suitable material, including for example, a textile, wood, metal, plastic, or any other suitable material capable of providing shade. In one embodiment, shade panel 140 may be an artistic element. Shade panel 140 may be opaque or translucent. Shade panel 140 may also comprise one or more colors. Shade panel 140 may also include a design element. This design element may be visible from above or below modular structure 100. Moreover, in an exemplary embodiment, the design elements are arranged to create visual creative works, messages, and/or art. In an embodiment, shade panel 140 may be the same size or half the size of solar collection panel 130. Shade panel 140 may also be proportionally sized such that it may be installed with SPHS 110 with solar panels 130 to provide an aesthetically pleasing appearance. In one embodiment, shade panel 140 may be any suitable size.

Figure 2:
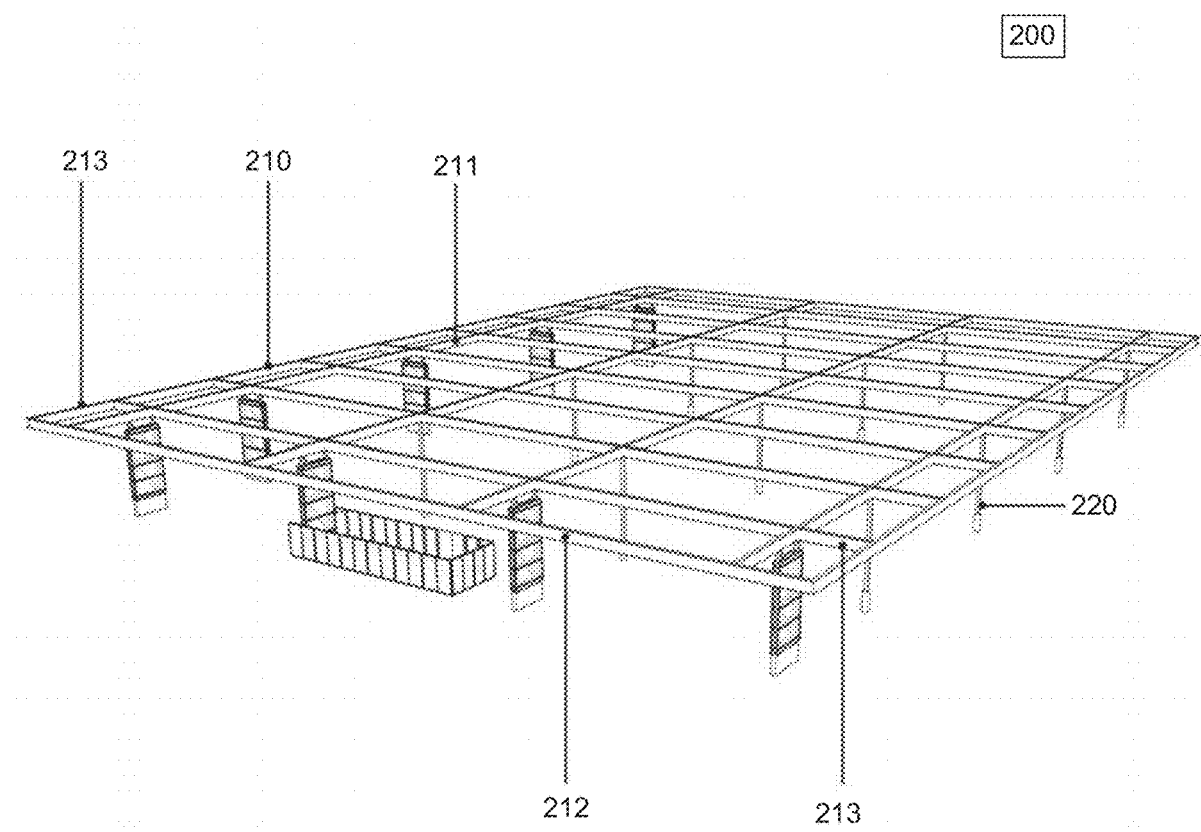
FIG. 2 illustrates an exemplary embodiment of the columns that are attached to a solar pane holding structure.

In an exemplary embodiment and with reference to FIG. 1 and FIG. 2, SPHS 110 is any structure configured to support one or more solar collection panels. SPHS 110 may, in various exemplary embodiments, also support one or more shade panels 140. In various embodiments, SPHS 110 may be modular or may have a unitary design. In one embodiment and with specific reference to FIG. 2, SPHS 210 is modular and may comprise a center section 211. SPHS 110 may further comprise at least one of one or more side sections 212 and one or more corner sections 213. In an embodiment, center section 211, side section 212 and/or corner section 213 may have horizontal structural beams around their edges.

In an embodiment, side section 212 is configured to couple to center section 211. Similarly, corner section 213 may be configured to couple to side section 212 or center section 211. In an embodiment, one or more corner section 213 and/or one or more side section 212 may be coupled to center section 211 in cantilevered arrangements. The cantilevered arrangements provide modular structure 200 with an architectural lightness. Moreover, in various embodiments, one or more side sections 212 and one or more corner sections 213 may be coupled to center section 211 to provide customizable SPHS 210. This allows modular structure 200 to be sized to fit the specific needs of the installation environment, site and context.

Figure 4A:
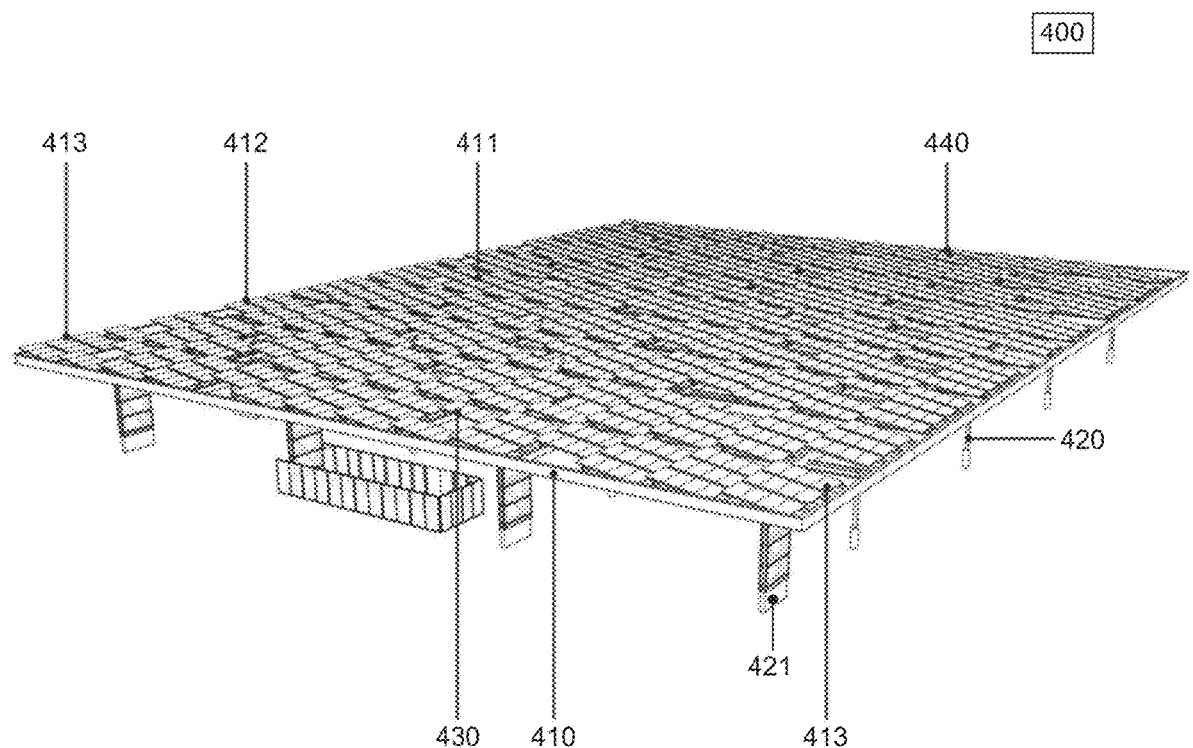
FIG. 4A illustrates a perspective view of an exemplary a modular structure including solar panels arranged to achieve dappling beneath the modular structure.

In an embodiment, center section 211 may be approximately 64 feet by 64 feet. In various embodiments, center section 211 may be larger than 20 feet by 20 feet but smaller than 64 feet by 64 feet. Moreover, in other embodiments, center section 211 may be larger than 64 feet by 64 feet but smaller than 128 feet by 128 feet. In an embodiment, side module 212 may be approximately 16 feet by 64 feet. In various embodiments, side module 212 may be larger than 8 feet by 20 feet but smaller than 16 feet by 64 feet. In various other embodiments, side structure 212 may be larger than 16 feet by 64 feet but smaller than 32 feet by 128 feet. In an embodiment, corner section 213 may be approximately 16 feet on a side. In various embodiments, corner section 213 may be larger than 8 feet on a side but smaller than 16 feet on a side. In various other embodiments, corner section 213 may be larger than 16 feet on a side but smaller than 32 feet on a side. Moreover, in various embodiments, dimensions of center section 211 (see also FIG. 4A, 411), side section 212 (412), and corner section 213 (413) vary within a single structure. This allows modular structure 200 to cover any space. For example, in a parking lot installation, modular structure 200 may be laid out on a 64' by 64' grid to provide spacing for a parking lot layout and to minimize the number of columns extending vertically from places other than parking stall lines. Modular structure 200 may also be laid out on a grid matching the dimensions of an existing parking lot layout and to minimize the number of columns extending vertically from places other than parking stall lines.

In an exemplary embodiment, center section 211 may be bisected in one direction by a structural beam from approximately the center of one side to approximately the center of the opposite side of center section 211. The installation of the structural beam may be configured to provide modular structure 200 with additional strength and rigidity under dead load, lift and/or shearing forces.

In another embodiment, modular structure 200 may comprise portions of the structure edged by structural beams. In one embodiment, the entire structure of modular structure 200 may be edged by structural beams. These structural beams may include, for example, I-beams, wide flange beams, square beams, tubes, and/or any other suitable structural beam or structure. In other example embodiments, the modular structure 200 may not be edged by structural beams, but rather the solar panels may extend out beyond the edges of SPHS 310. For example, purlins attached to SPHS 310 may support the solar panels. And in an example embodiment, the purlins may extend beyond the structural beams to support the panels cantilevered outward from the structure.

Figure 3:
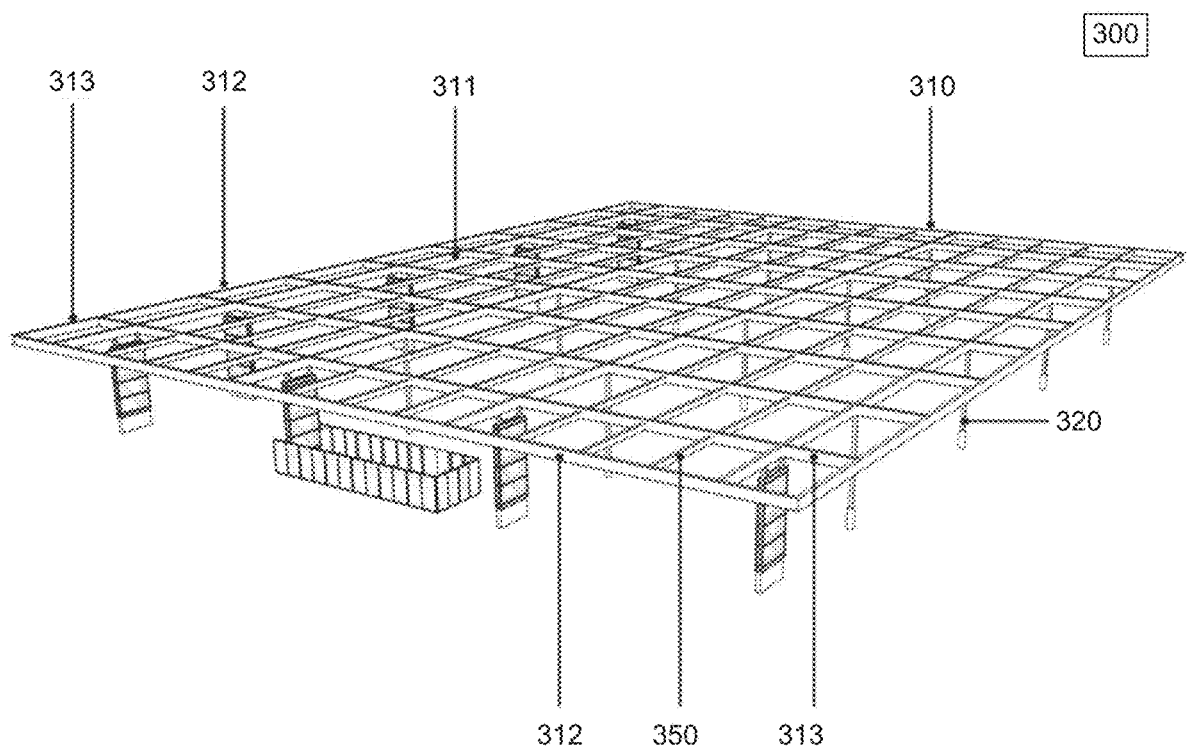
FIG. 3 illustrates an exemplary embodiment of joists in place between structural beams.

In an exemplary embodiment and with reference to FIG. 1 and FIG. 3, modular structure 300 may further comprise one or more panel supports 350. Panel support 350 may be coupled to SPHS 310 in any fashion and in any orientation. In an embodiment, panel support 350 is configured to couple to at least one of center section 311, side section 312 or corner section 313. Panel support 350 may couple to any one of center section 311, side section 312 or corner section 313 in any orientation, such as for example, at a customizable angle. In an embodiment, panel support 350 is configured to couple to and to support solar energy collection panel 130. Similarly, panel support 350 may be configured to couple to and to support shade panel 140.

In various embodiments and with reference to FIG. 3, FIG. 4A, FIG. 4B, and FIG. 4C, one or more solar collection panels 430 are installed in SPHS 410 at one or more panel supports 350. Solar collection panels 430 may be installed on SPHS 410 in a uniform manner. For example, solar collection panels 430 may be installed at every installation location on panel support 350 in SPHS 410 at a common angle. Similarly, solar collection panels 430 may be installed in a pattern at particular installation locations on panel support 350 in SPHS 410 at a common angle. For example, solar collection panels 430 may be arranged in a particular fashion to display a logo that can be viewed from above the structure.

In another embodiment, solar collection panels 430 may also be installed on SPHS 410 in a non-uniform manner. For example, solar collection panels 430 may be installed at some or all of the available installation locations on panel support 350 in SPHS 410 at different angles and directions. For example, rows of panels may be arranged in opposing directions such that a first group of panels receive sunlight in the morning as the sun rises and a second group of panels receive sunlight in the afternoon and as the sun sets. A third group of panels may be arranged such that they are relatively parallel with the ground so that they receive sun light during mid-day, when the sun is overhead and the intensity of the sunlight is highest. Solar collection panels 430 may be arranged in varying directions and at varying angles in a single structural module. The panels 430 may also be arranged in varying directions and at varying angles by structural module, such that the orientation of a first group of solar collection panels are consistent across a first structural module but are different from the orientation of a second group of solar collection panels across a second structural module.

In another embodiment, solar collection panels 430 may be positioned and tilted in modular structure 400 at such an angle that their full length remains within the height of the edge beams. In other example embodiments, the solar collection panels may be located on supports, e.g., purlins, located above SPHS 410. In various embodiments, solar collection panels 430 may be positioned at varying angles between approximately 5 degrees and 15 degrees. In one embodiment, solar collection panels 430 may be positioned at varying angles between approximately 5 degrees and 10 degrees. In another embodiment, solar collection panels 430 may be positioned at approximately 8 degrees. Solar energy collection panels 430 may also be positioned and tilted in modular structure 300/400 at such an angle that some portion of their length extends beyond the height of the edge beams.

In a typical solar installation in the Northern Hemisphere, solar panels are tilted to the south. As a general rule the optimal angle of panel tilt to the south approximates the latitude of the location. As an example, in the Phoenix, Ariz. area the latitude is about 33° N and solar panels might be tilted at angles approximating 30°. In addition it is important to note that the angle of the sun varies according to the season. As an example, in Phoenix, Ariz. the angle of the sun at noon varies from 32° in winter to 78° in summer. In a typical solar installation panels are spaced south to north so that the panel to the south does not shade its neighboring panel to the north even at the angle of the sun in the winter. However, when considering the design of a solar shade structure, the time the shade is most desired is in the summer. Panels placed at the optimum angle for energy collection and spaced to eliminate shading in winter would allow approximately 50% of the sunlight to reach the ground at noon in the summer.

Moreover, solar shade structures over public or private areas in urban areas need to cover an area determined by the space available. In such installations, solar panels placed at the optimal angle for efficiency per panel do not generate the optimum energy for the structure. As such, in an embodiment, modular structure 400 may comprise solar collection panels placed between approximately 5 degrees and approximately 15 degrees in order to provide adequate shade in the summer. Further, solar collection panels 430 placed at angles between approximately 5 degrees and approximately 10 degrees will allow more rows of solar collection panels 430 and generate more energy than structures with panels placed at steeper angles. As such, solar shade structures in fixed spaces may be best served with panels place at angles of 5° to 10° for two reasons; increased revenue from energy collected and increased shade provided in the summer months.

Moreover, in various embodiments, installation angles between approximately 5 degrees and approximately 15 degrees allow solar collection panels 430 to drain when subjected to rain. This range of angles may also allow panels to be arranged to allow drainage, while achieving a panel density to provide an effective amount of power output in a confined space. Where space is confined, solar collection panels may be installed at angles of less than 28 degrees to achieve more efficient power outputs. In an example embodiment, the energy generation per square foot of the overall solar panel structure (as opposed to per square foot of panel) increases with a decrease in the angle from 10 degrees to 5 degrees. This is counter intuitive because, in Phoenix, the efficiency of an individual solar panel will go down as the angle is reduced from 10 degrees to 5 degrees. But this improvement in energy generation density is due to the ability to add rows of panels with the lower angle of the panels due to less self-shading from the panel in front, allowing a greater panel density even while decreasing the efficiency of individual panels.

In an embodiment, the non-uniform placement of panels may be configured to achieve greater power generation efficiency based on the installation angle of each solar collection panel 430. The ability to install solar collection panels 430 at different directions and angles may increase the power generation efficiency of the structure because the panels may be individually positioned such that they are engaged by sunlight for an optimum time as the sun moves across the sky throughout the day.

A non-uniform arrangement of solar collection panels 430 may be desirable for environmental or aesthetic reasons. For example, the non-uniform placement of solar collection panels 430 may be configured to provide a desired lighting effect. To further achieve the desired lighting effect, solar collection panels 430 may not be installed in particular locations to allow light to pass through modular structure 300/400 and reach the ground under modular structure 300/400.

In various embodiments, one or more shade panels 440 may be installed in SPHS 310/410 at one or more panel supports 350. Shade panels 440 may be installed in SPHS 310/410 with solar collection panels 430. Shade panels 440 may be installed on SPHS 310/410 in a uniform manner. Shade panels 440 may also be installed on SPHS 310/410 in a non-uniform manner. This non-uniform arrangement of shade panels 440 may be desirable for environmental or aesthetic reasons. For example, the non-uniform placement of shade panels 440 may be configured to provide a desired lighting effect. Moreover, solar collection panels 430 and shade panels 440 may not be installed at specific installation locations along panel supports 350. The omission of panels at a particular location(s) may be desirable to provide direct sunlight to vegetation or features placed under modular structure 300/400.

Figure 4B:
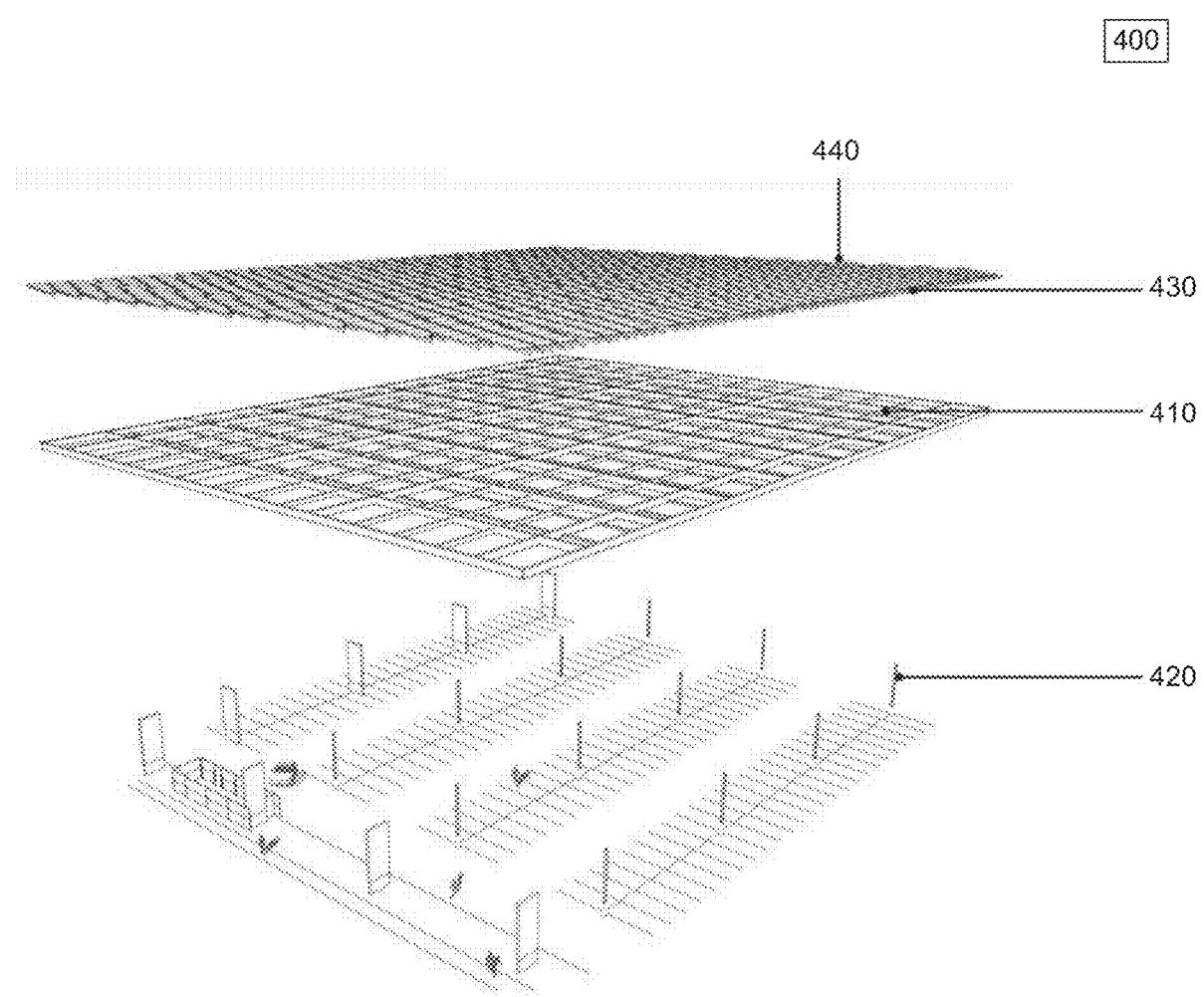
FIG. 4B illustrates an exploded view of an exemplary installation of a modular structure over a parking area.
Figure 4C:
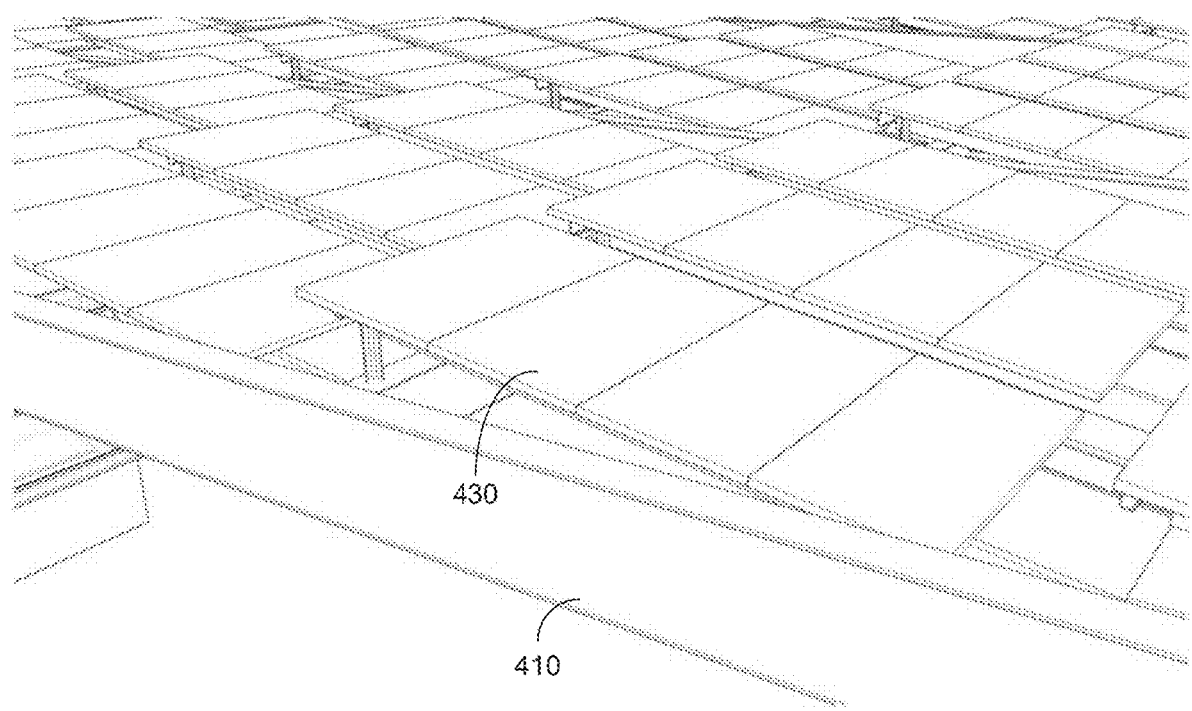
FIG. 4C illustrates a close up view of a portion of an exemplary installation of a modular structure.

In another exemplary embodiment and with momentary reference to FIG. 1 and FIG. 4B, solar collection panels 130/430 are attached, removed and serviced from underneath the solar panels. For example, the majority of, or all, panel attachment devices and support mechanisms of solar collection panel 130/430 can be accessed and operated from below the panels. Similarly, solar collection panels 130/430 can be removed from below and replaced with different and/or more efficient panels. Moreover, the supporting connections and circuitry required to use the energy created by solar collection panels 130/430, including for example, an inverter(s) may be located under and shaded by modular structure 100/400. Moreover, the ability to access and service solar collection panels 130/430 facilitates greater panel density where installation space is confined because access from the top of the structure defining the confined space would require access lanes where panels could otherwise be installed. Further, in a ground installation (e.g. a solar farm) the support structure made access from the bottom of the panel impractical. Moreover, because ground installations do not generally have concerns about space, access lanes can easily be included. Thus, in an exemplary embodiment, modular structure 100/400 comprises a supporting structure that does not restrict the ability to remove and install solar collection panels, and/or similarly does not comprise access lanes.

In another exemplary embodiment, modular structure 100/400 comprises one or more sections of the structure configured to either move or rotate up or down or may be removed entirely to allow a person to move up through the modular structure 100/400 to clean, service or inspect solar collection panels 130/430 and shade panels 140/440.

In an exemplary embodiment and with reference again to FIG. 3, FIG. 4A, FIG. 4B, and FIG. 4C, solar collection panels 430 and shade panels 440 may be spaced apart when installed along panel support 350. As installed, SPHS 310/410 may be installed at a height of 18 feet or more. As a result, SPHS 310/410 may be subjected to increased air flow from wind. While this airflow does provide cooling, it may also exert forces, including for example, lift forces and shearing forces on SPHS 310/410. As such, solar collection panels 430 and shade panels 440 may be spaced apart. This spacing allows the airflows to pass through SPHS 310/410, which reduces the lift and/or shearing forces exerted on SPHS 310/410.

Electrical Components Mounted in Columns

In an example embodiment, and with reference to FIGS. 5A through 5G, and particularly 5F, a solar energy shade structure 500 can comprise a solar panel support structure 510, a plurality of solar panels 530 supported by the solar panel support structure 510, a plurality of vertical supports 580 connected to the solar panel support structure 510 for supporting the solar panel support structure 510 elevated above a surface 570, and a column 550 with at least one electrical component 560 that is mounted, in a screened manner, to column 550. This "mounting in a screened manner" is described further below.

In one example embodiment, electrical component 560 comprises a string inverter. In another example embodiment, electrical component 560 comprises a combiner. In various example embodiments, one or more string inverters and one or more combiners are mounted to a single column. In another example embodiment, electrical component 560 comprises an energy storage device, such as a battery. Moreover, electrical component 560 may comprise other electronics suitable for use in connection with a solar energy structure. Moreover, any suitable combination of electrical components may be mounted to the column 550, such as one or more of the following: string inverter, combiner, energy storage device, and/or electronics.

In the example embodiment where electrical component 560 comprises a battery, solar panels 530 may be electrically connected to the battery in any suitable manner. In one example embodiment, solar panels 530 may be electrically connected to the battery through a charge controller. Stated another way, the battery may be charged by solar panels 530 without losses inherent to AC/DC and DC/AC conversions. In other example embodiments, the battery may be charged from AC power, either from inverters or the grid.

String Inverter

Generally, an inverter converts direct current (DC) electricity to alternating current (AC) electricity. In the past, a solar panel installation would connect all the power from the solar panels 530 to a central inverter. For relatively large solar panel installations, these central inverters tend to be large, noisy, and take up a large footprint on the ground. For example, a central inverter sized for a ½ MW solar panel installation could be large enough to consume the space that could otherwise be used for several parking spaces. Thus, use of a central inverter in connection with a solar energy shade structure 500 reduces the usable space. For example, the area under a solar energy shade structure 500 that could be devoted to parking space (and thus the number of parking spaces) is reduced by the amount of space consumed by the central inverter. Such use of a central inverter located on the ground, as it must be due to its size, would also block the view under the solar panel support structure 510, and this would make the space under the structure less aesthetically pleasing.

In contrast to a central inverter that converts all of the power of the solar panel installation, a string inverter only converts a portion of the power from the solar panel installation. In one example, the string inverter may have a CEC-rated power from 2 kW to 50 kW. For example, the string inverter might only handle up to 25 kW, 30 kW, 36 kW, 50 kW or more out of out of a 500 kW installation. Moreover, as string inverter technology improves, the string inverter may be able to convert more electricity per string inverter. Nevertheless, as used herein, a string inverter is smaller in size and weight than a central inverter and handles only a portion of the electricity from a solar panel installation. In particular, the string inverter converts, from DC to AC, the electricity from a 'string' of solar panels 530. Although improvements in technology may allow more or less solar panels per 'string,' in one example embodiment, a string inverter may receive power from 50-100 solar panels. In an example embodiment, the number of panels per string inverter may be approximately (though this depends on design considerations, and it is typical that the total Watt rating of the panels exceeds the string inverter Watt rating) the total watt rating of the inverter divided by the individual watt rating of each panel.

In an example embodiment, the electrical component comprises a string inverter 531. In an example embodiment, string inverter 531 is small and light weight compared to a central inverter. For example, string inverter 531 maybe 14 inches to 60 inches tall, or preferably 24 inches to 50 inches tall, or more preferably 28 inches to 45 inches tall. For example, string inverter 531 maybe 10 inches to 20 inches wide, or preferably 12 inches to 18 inches wide, or more preferably 12 inches to 15 inches wide. For example, string inverter 531 may be 5 inches to 14 inches deep, or more preferably 5 inches to 12 inches deep. Although specific example ranges of the size of string inverter 531 are provided herein, the string inverter can be any size significantly smaller than a central inverter for the structure.

Moreover, the height of string inverter 531 is less than the column height, wherein the column height is the height from the ground to the underside of the solar panel holding structure 410. Also, the width of string inverter 531 is less than the column width and the depth of string inverter 531 is less than the column depth. In an example embodiment, the column width is measured from outside edge to outside edge across the width of the column at its widest cross-section including any side panels, screens, or other parts of the column, and the column depth is measured from outside edge to outside edge across the depth of the column at its deepest cross-section including any cladding, cladding support, screens, or other parts of the column. In a specific example embodiment, the height of string inverter 531 is less than half the column height, the width of string inverter 531 is less than half the column width, and/or the depth of string inverter 531 is less half than the column depth.

Moreover, in an example embodiment, string inverter 531 can weigh from 30 pounds to 200 pounds, preferably from 40 pounds to 150 pounds, and more preferably from 40 pounds to 80 pounds. However, with advances in technology, the string inverter may weigh significantly less than these example ranges, but still, in an example embodiment, be significantly lighter than a central inverter. It is noted that these dimensions and weights exclude the disconnect and input/output cables and the like. In an example embodiment, the string inverters may have active or passive cooling. In an example embodiment, the string inverters may have a noise level (in dBA) with fans running for active cooling less than 65, preferably less than 55, more preferably less than 45, and even more preferably less than 35 (all at 3 meters from the string inverter). And for passive cooling, in an example embodiment, the string inverters may have a noise level (in DBA) less than 50, preferably less than 35, and more preferably less than 25 (all at 3 meters from the string inverter). The string inverter may have one or three phases.

Combiner

Generally, a combiner combines the output of two or more individual string inverters. As mentioned above, the output of the string inverter output is an AC output. Historically, the output of each solar panel has been run to a combiner box, the output of the combiner box has been provided to a central inverter, and the output of the central inverter has been provided to a meter or grid interconnect point.

Figure 5A:
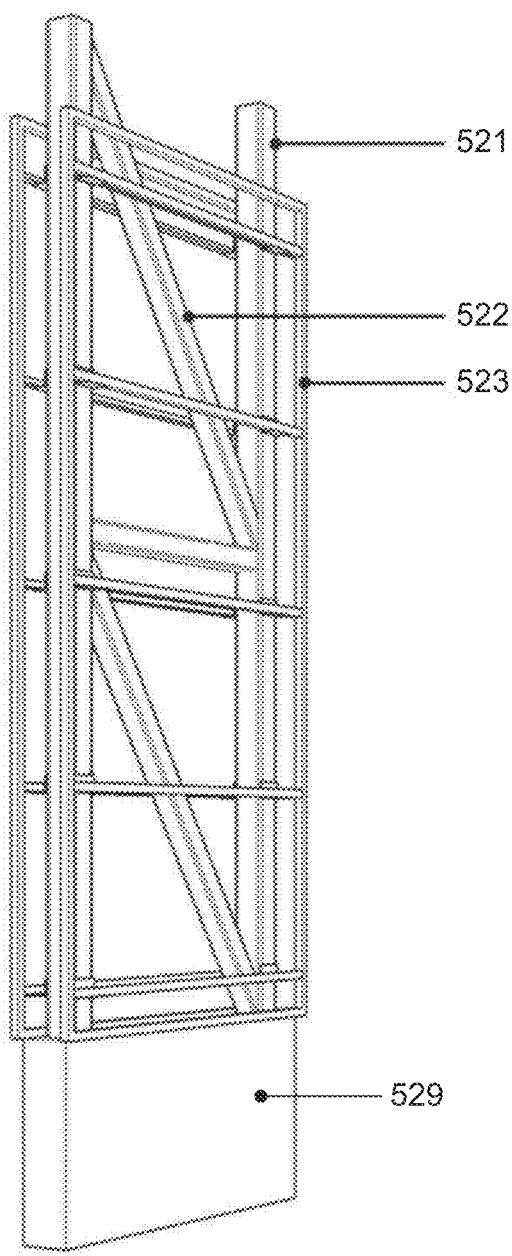
FIG. 5A illustrates a perspective view of an un-cladded brace-frame in accordance with an exemplary embodiment.
Figure 5B:
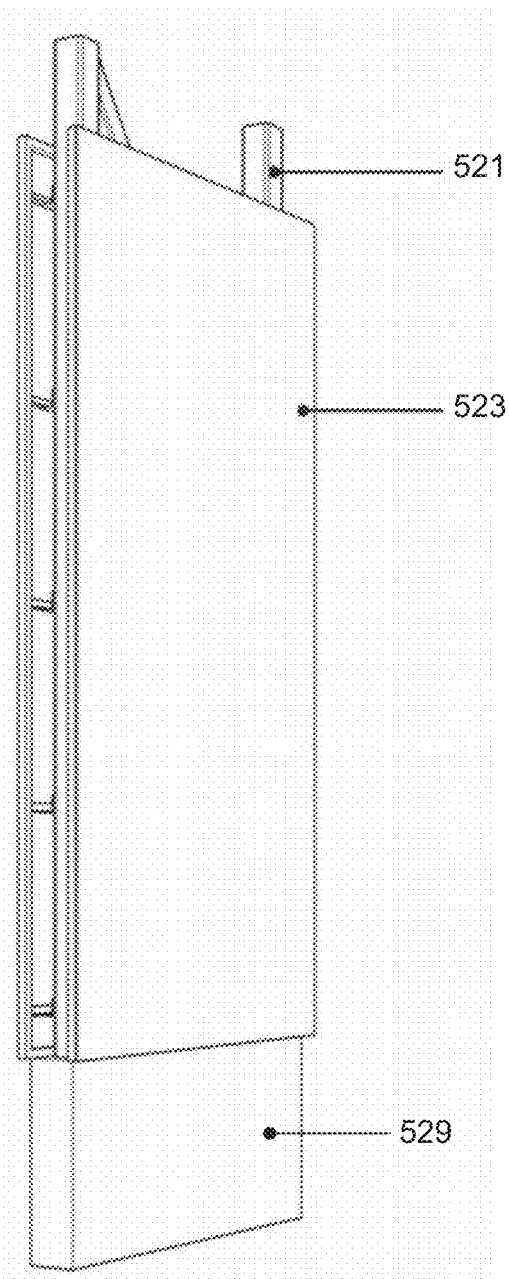
FIG. 5B illustrates a perspective view of a cladded brace-frame in accordance with an exemplary embodiment.
Figure 5C:
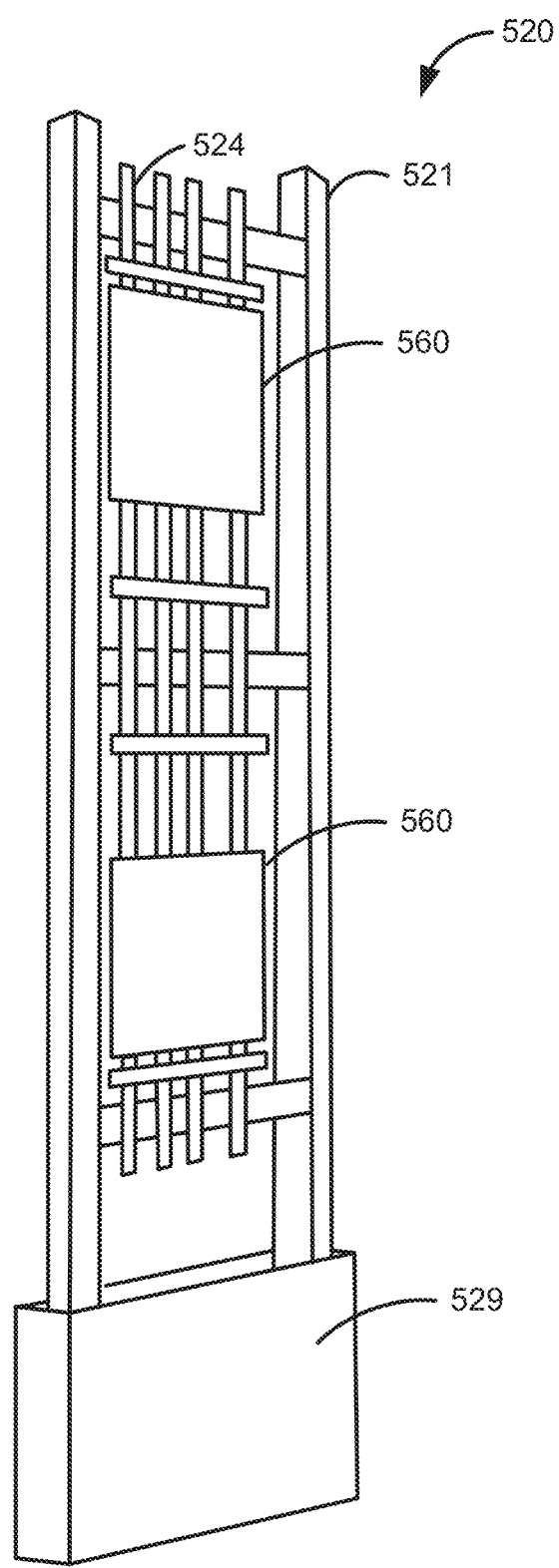
FIG. 5C illustrates a perspective view of a brace-frame with the cladding removed to provide a view of a component mounting frame and electrical components, in accordance with an exemplary embodiment.
Figure 5D:
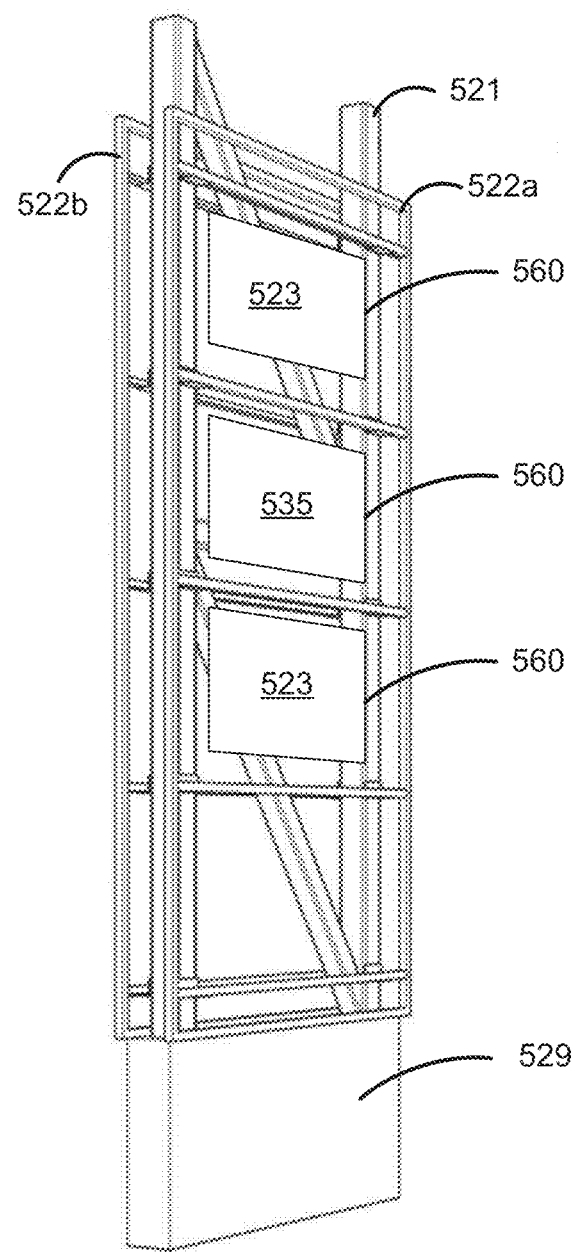
FIG. 5D illustrates another perspective view of a brace-frame with the cladding removed to provide a view of electrical components, in accordance with an exemplary embodiment.
Figure 5E:
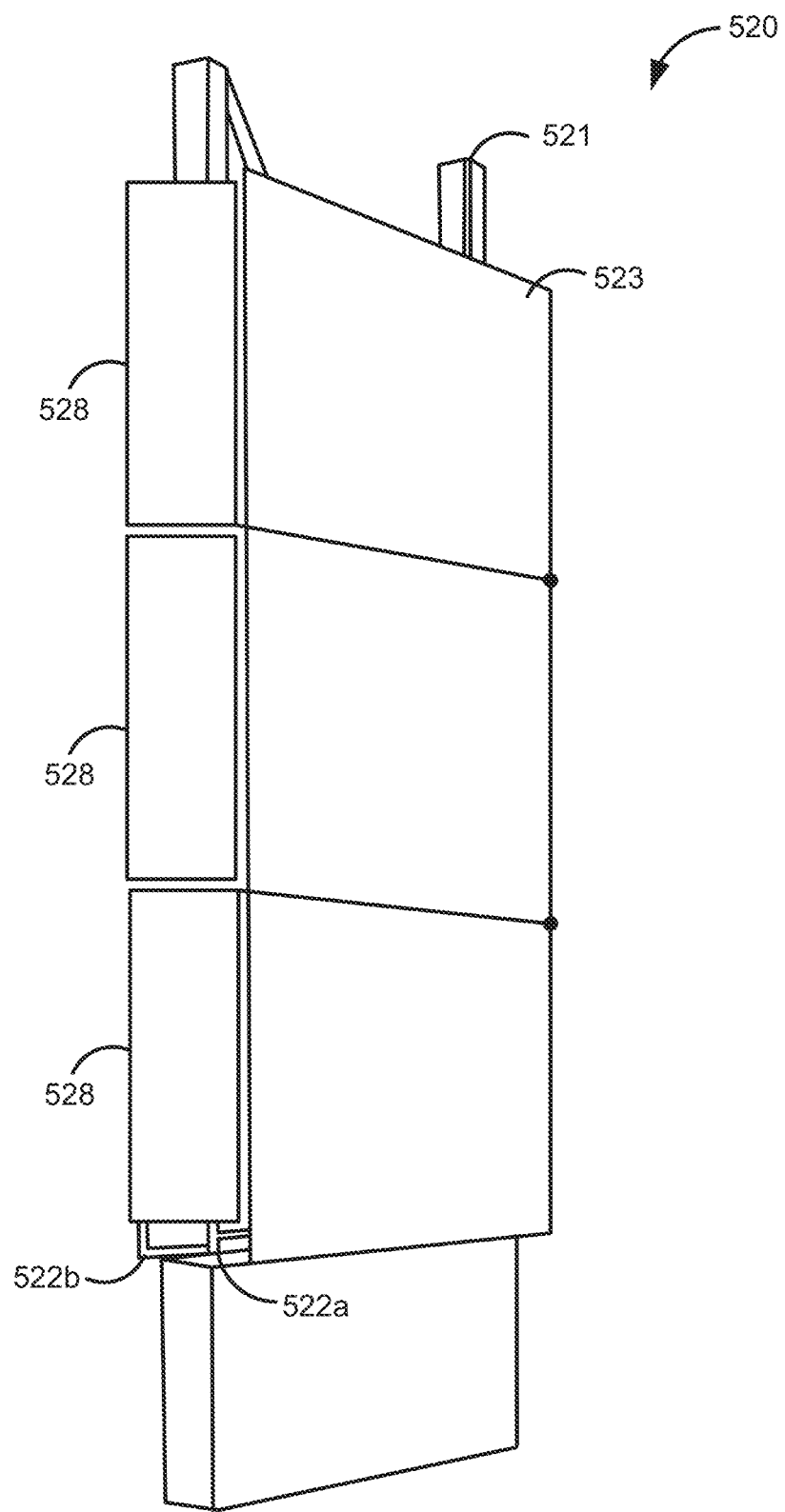
FIG. 5E illustrates a perspective view of a column having front, back (not visible), and side enclosure panels in accordance with an exemplary embodiment.
Figure 5F:
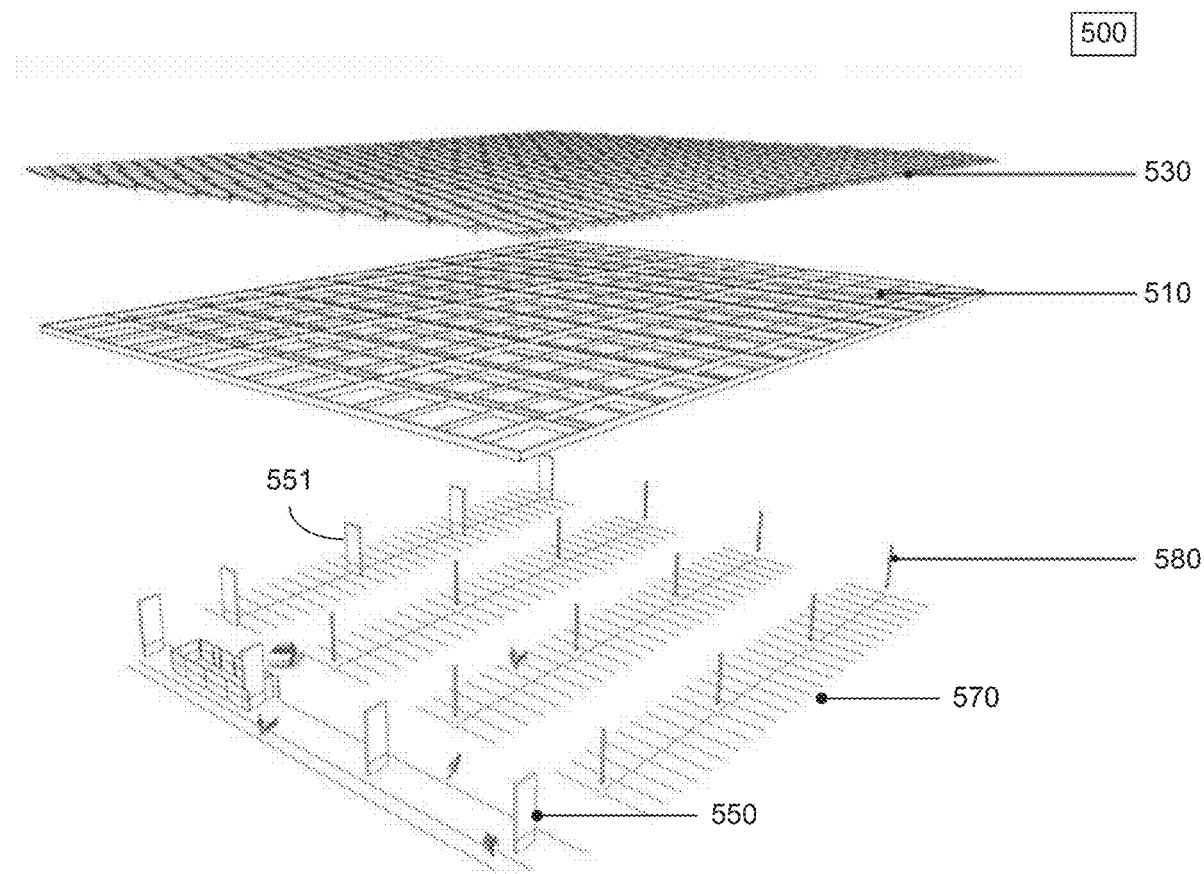
FIG. 5F illustrates an exploded view of an example installation of a solar energy shade structure over a parking area, including the columns containing the electrical components (not shown)
Figure 5G:
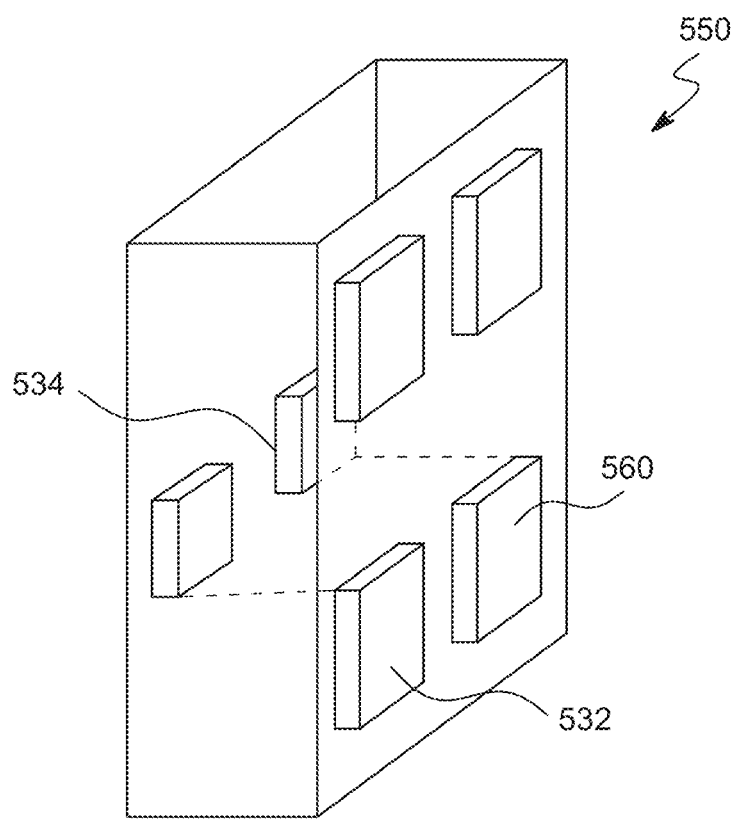
FIG. 5G illustrates a perspective view of an example column including example electrical components associated therewith.
Figure 5H:
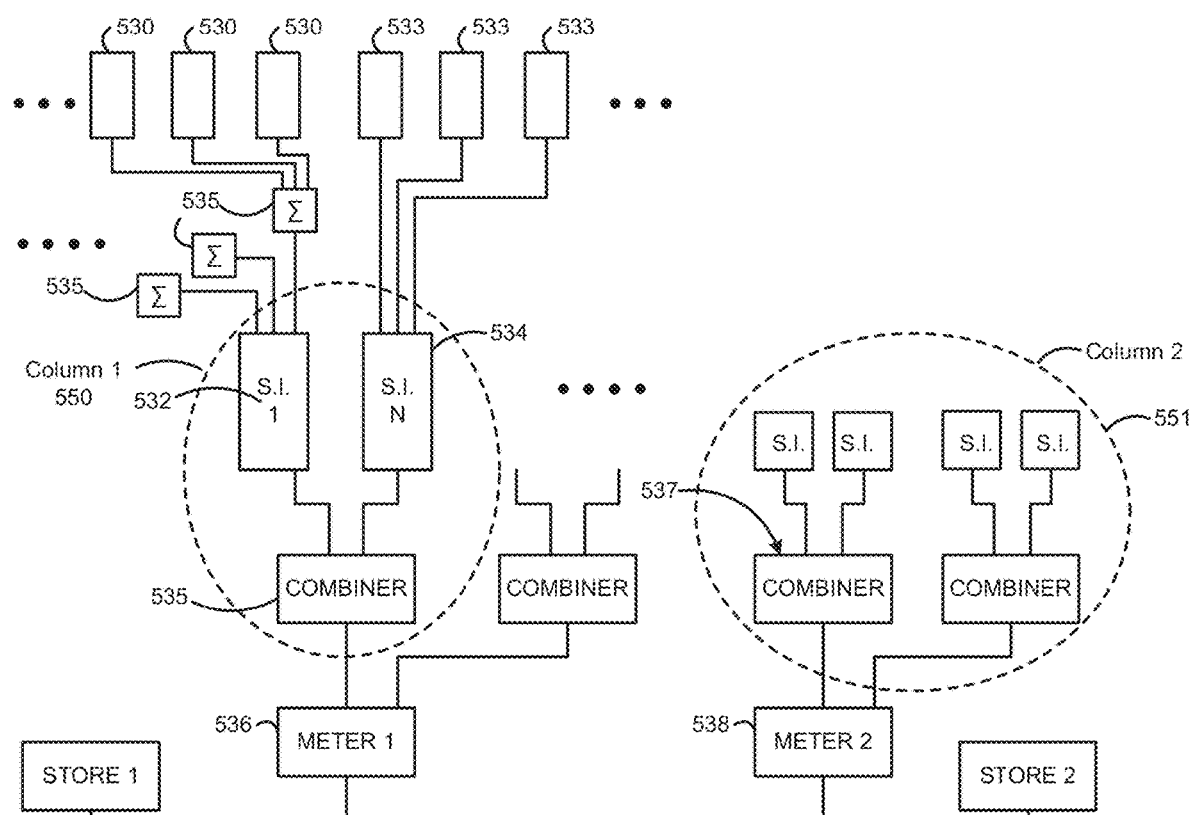
FIG. 5H is a schematic drawing of an example electrical system for a solar energy shade structure, including example string inverters and combiners.

However, in an example embodiment, with reference to FIG. 5H, various combinations of combiners and inverters may be used to convert the power from the solar panels from DC to AC and to provide it to one or more meters. Power from panels (530, 533) can be combined, provided to string inverters, and/or further combined before being provided to a meter. In other embodiments, power from solar panels is provided directly to string inverters, and or power from string inverters is provided directly to a meter. Thus, it should be understood that the example discussed in connection with FIG. 5H is only one of many combinations of combiners and string inverters that may be used. In an example embodiment, the output of two or more solar panels 530, from a first string of solar panels, is provided to a first string inverter 532. As another example, the output of solar panels 530 may first be combined via one or more combiners 535 prior to being provided to first string inverter 532. Similarly the output of two or more solar panels 533, from an Nth string of solar panels, is provided to an Nth string inverter 534. In this example, the output of solar panels 533 is provided directly to the Nth string inverter 534.

In this example embodiment, the output of the first through Nth string inverters is combined in a combiner 535, wherein the first string inverter 532 through Nth string inverter 534 and combiner 535 are all located in column 550. In other embodiments, some or all of the combiners can be located away from column 550. This can be repeated in parallel with additional solar panels, string inverters, and combiners.

As mentioned above, column 550 can contain both string inverters (532, 534) and combiners 535. Thus, a column may contain two string inverters and a combiner. In other example embodiments, column 550 contains 8 string inverters and 2 combiners. Moreover any suitable combination of and number of string inverters and combiners can be associated with a single column. Combining the string inverter outputs at column 550 reduces the number (and possibly increases the size) of conductors that are routed away from the solar panel installation (compared to the number and size of conductors that are routed away from a similar structure that does not employ the combiner(s)).

Moreover, in an example embodiment, the output of a first combiner 535 or first string inverter can be connected to a first meter station 536 and the output of a second combiner or second string inverter can be connected to a second meter station 538. In this manner, power from a single solar panel installation can be provided to multiple meter stations. Thus, in an example embodiment, the power output from a single solar energy structure can be provided to two different businesses, buildings, meters, stores, and/or the like. For example X % of the power can be provided, via first meter station 536, to a first big box store, and 100%-X % could be provided, via second meter station 538, to a second big box store located near the first big box store. Generally, the stores sharing power would be in proximity to the solar energy structure, but could be side by side or on opposite sides of the solar energy structure. In an example embodiment, the solar energy structure is configured to output a portion of the power of the overall solar energy structure from a first location to a first meter station 536, and to output a second portion of the power of the overall solar energy structure from a second location to a second meter station 538. In an example embodiment, the first location is a first column 550 near a first side of the solar energy structure and the second location is a second column 551 near a second side opposite the first side of the solar energy structure. In an example embodiment, placing the string inverters in column 550 shortens the average electrical connection length between the panel 530 and string inverter 531 compared to use of a central inverter. Some of this discussion, particularly starting with FIG. 5H, may be applicable, irrespective of where the string inverters are placed, and whether or not the structure has brace-frames or columns, and in an example embodiment is most beneficial in a large parking lot where more power can be generated than is used by one business near that parking lot, and/or in the context of a micro-grid supporting multiple meters each for a different business.

Column 550

Column 550 may further comprise the main column member(s) 521, and electrical component support members 524. In a further embodiment, column 550 comprises electrical component shielding panels ("panels") 523. The main column member(s) 521 may comprise, for example, structural steel, I-beams, wide-flange beams, channel beams, angle beams, posts, poles, square shell, cylindrical shell or tube, and the like column members. For example, the main column member 521 may comprise an I-beam. In other embodiments, the main column members 521 can comprise two structural vertical members with a K brace structure 521a between them. In another embodiment, the main column members 521 are formed by four structural vertical members that are located near the corners of column 550 with interconnecting members for lateral strength. Moreover, any suitable column construction materials and shape may be used if it can support one or more string inverters. In an example embodiment, the main column member(s) may be connected to the pillar 529.

The electrical component support members 524 can comprise smaller supporting structures, connected to the main column member(s) 521, and configured to support one or more string inverter 531 and/or combiner 535. For example, the electrical component support members 524 may comprise angle iron, extruded metal, metal strapping, plates, and or the like. In one example embodiment, a string inverter is mounted to a flat panel or other electrical component support member using mounting brackets. However, the electrical component can be mounted directly to the main column member(s) 521. In an example embodiment, and with reference to FIG. 5G, a first string inverter 532 is mounted in a front portion of column 550 and a second string inverter 534 is mounted in a back portion of column 550. In this manner, access to some string inverters may be best from one side (a front side) of column 550, while access to other string inverters may be best from the opposite side (a rear side) of column 550. In an example embodiment, these first and second string inverters are not mounted back to back. Rather, the first string inverter is in staggered arrangement with the second string inverter. For example, the first string inverter 532 may be located above and on the opposite side of the second string inverter 534. In this manner, the heat from one string inverter is not flowing directly into the string inverter behind it. In another example embodiment, the first string inverter is mounted back to back with the second string inverter with a plate between the two inverters. The plate can be any suitable structure or barrier that prevents or partially prevents direct airflow or radiant heat transfer between the first and second string inverters when mounted back to back.

Pillar

Figure 5I:
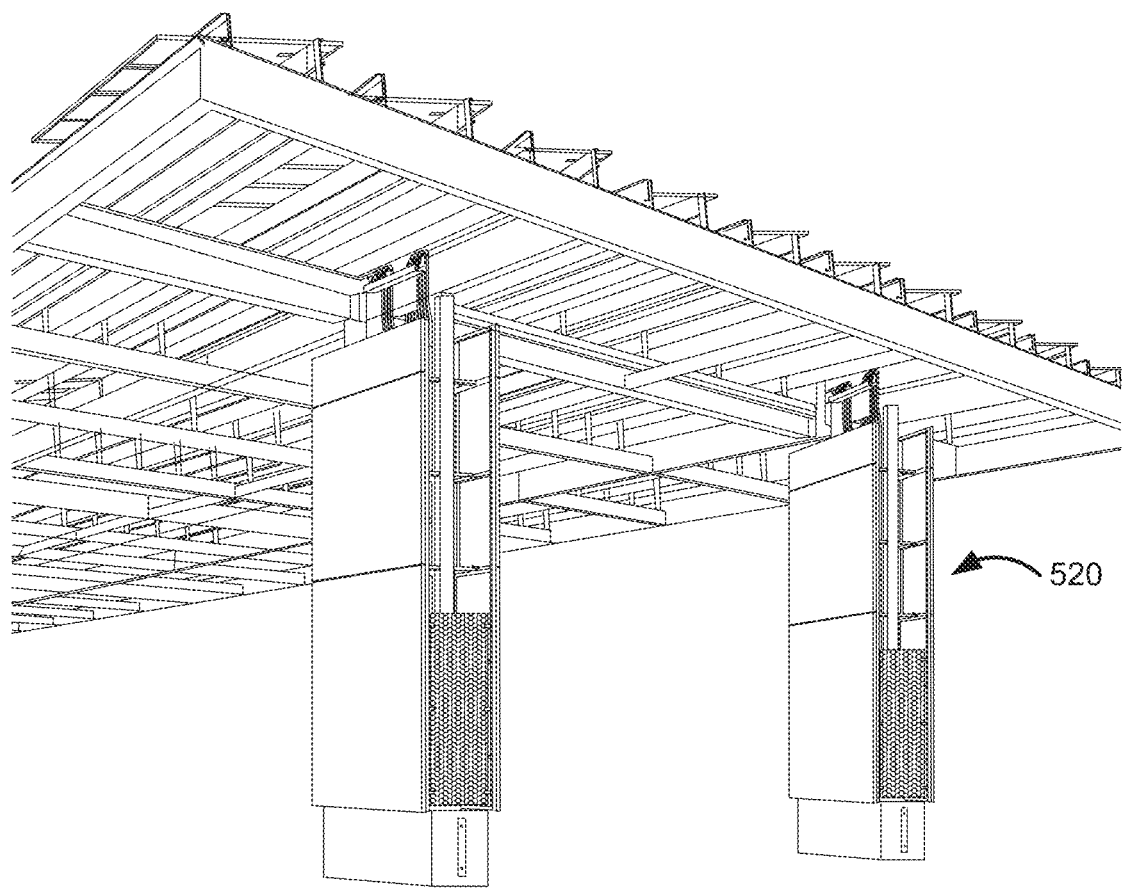
FIG. 5I illustrates another perspective view of a column having front, back, and side enclosure panels in accordance with an exemplary embodiment.
Figure 5J:
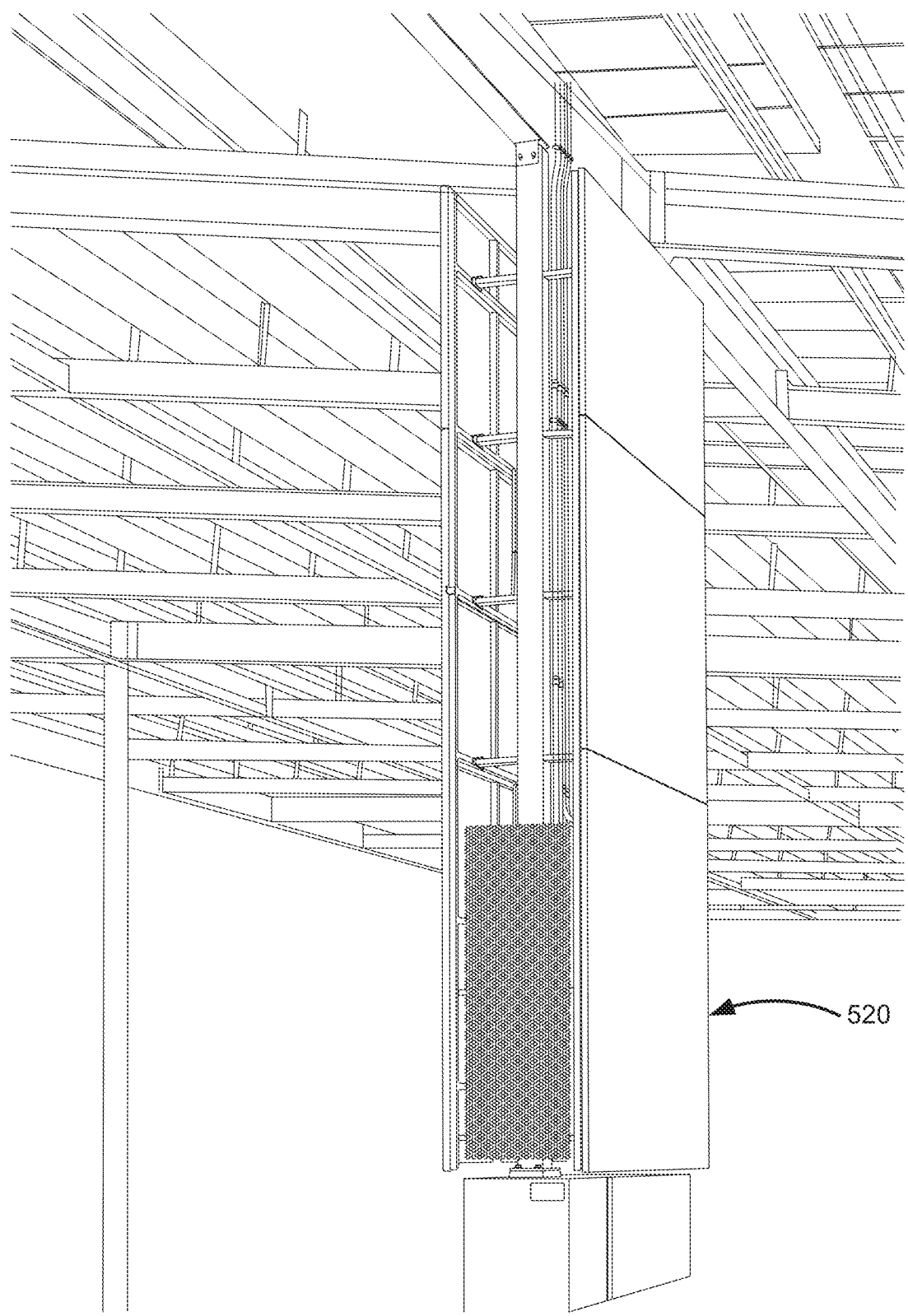
FIG. 5J illustrates yet another perspective view of a column having front, back, and side enclosure panels in accordance with an exemplary embodiment.

Column 550 may further comprise a pillar. The pillar can be a concrete base structure, with a foundation in the ground, providing protection from an automobile or other heavy objects running into it. The pillar may also comprise an artistic element and be of any suitable shape. In an example embodiment, the pillar can be thicker than the steel of the column, and the steel is mounted or embedded in the concrete of the pillar. In some embodiments, the pillar is thinner than the thickness of the column. In other embodiments, no pillar is used. With reference to FIGS. 5E, 5I, and 5J, the pillar 529 is about six feet tall, and roughly the width and depth of the column 550, though other dimensions could also be used.

In an example embodiment, string inverter 532 is mounted to column 550 above ground level. For example, the string inverter may be mounted greater than 0, 2, 3, 4, 5 or 6 feet above the ground level at the point below the solar panel support structure 510, or any other suitable height. Mounting string inverter 532 above ground level can protect the string inverter from people or various animals, the people or the animals from string inverter 532, and string inverter 532 from accident from vehicles or from ground water, and the like. In one example, the string inverters are installed above pillar 529.

Screening

As mentioned above, column 550 may have one or more electrical components 560 that are screened or concealed by column 550. Although sometimes described herein in terms of string inverters, the descriptions may equally be applicable for electrical components 560 more generally. In an example embodiment, electrical component 560 is mounted in a screened manner. In an example embodiment, this "mounting in a screened manner" means that electrical component 560 (e.g., string inverter 532) is concealed from view, hidden, obscured from view, and/or kept from sight or un-authorized access. Although this concealment, etc. may be a complete shielding from view, in an example embodiment, this "mounting in a screened manner" means that the electrical component 560 (e.g., string inverter 532) is made inconspicuous, has had its visibility reduced, has been made less noticeable, or has been made less observable (all compared to a sting inverter that is not shielded but merely strapped to the outside of a pole or beam for all to see).

In one example embodiment, it may be said that the string inverter obstructs the view under the solar energy shade structure 500 no more by its presence than without its presence. Stated another way, the view under the solar energy shade structure 500 is not substantially obstructed any more by the addition of the electrical component 560 (e.g. string inverter 532) than by the presence of column 550 itself.

In an example embodiment, and with reference to FIG. 5G, this mounting in a screened manner is effected by locating, placing, attaching, situating, or mounting the electrical component 560: inside column 550, within the column, contained within the column, housed inside the column, and/or contained within the outermost portions thereof, and/or sheltered within the column. Thus, in an example embodiment, electrical component 560 is located within the outermost portions of column 550 to at least partially screen electrical component 560.

In another example embodiment, electrical component 560 (e.g. string inverter 532) is concealed from view or at least partially concealed from view by panels or screens or the like. For example, the electrical component 560 (e.g. string inverter 532) is covered, covered-up, hidden, camouflaged, masked, wrapped, screened, veiled, and/or enshrouded by objects forming part of column 550 or attached thereto. In an example embodiment, the object screening the electrical component 560 (e.g. string inverter 532) is a panel 523 that obscures the view of or conceals the string inverter 532. Panel 523 may comprise a thin rectangular object covering at least a portion of one side of column 550. Panel 523 may be at least as large in its length and width as the electrical component 560 that it is screening. In an example embodiment, panel 523 is a sign or a portion of a sign. In another example embodiment, panel 523 comprises an advertisement or billboard. In another example embodiment, panel 523 comprises a decorative panel. In another example embodiment, panel 523 is a screen. Panel 523 may comprise a lighting element. In various example embodiments, panel 523 is at least partially made of a material such as: a perforated metal, a mesh or a fabric screen. Panels 523 may be configured to permit air to flow through them. Thus, panel 523 may also comprise an artistic design, artwork, signage, advertising, or the like, doubling as both a screen and an attractive or useful communication element.

In an example embodiment, panels 523 may cover the full length of the front and back of column 550. In another example embodiment, panels 523 may be tall enough to protect the electrical component(s) and humans from each other. However, panels 523 may cover any suitable portion of column 550, at a minimum protecting from full view at least a portion of the electrical components within column 550 from view. In an example embodiment, the electrical components are obscured from view on both the front and back of column 550.

In an example embodiment, panels 523 are configured for ease of accessing that which is behind panel 523, particularly string inverter 532 and/or combiner 535. For example, panel 523 may comprise hinges to function as doors that can be swung open to access the string inverters and/or combiners. In another example embodiment, panels 523 are removable for the same purpose. In an example embodiment, panels 523 are attached by any attachment mechanism suitable for temporarily removing the panel, such as screws, bolts, and or the like. In various example embodiments, panels 523 are divided into sections, such as top, middle and bottom sections so that individually, when opened, the wind does not catch them as much. Column 550 may further comprise stops for arresting the swing of the door at a predetermined location to protect people, the panels themselves, and column 550.

Column 550, in one example embodiment is a structure having a height sufficiently high for mounting at least two string inverters with one mounted above the other, a depth at least as great as the depth of a string inverter, and a width at least as great as the width of a string inverter. In another example embodiment, column 550, is a structure having a height sufficiently high for mounting at least two string inverters with one mounted above the other, a depth at least as great as twice the depth of a string inverter, and a width at least as great as the twice the width of a string inverter. Moreover, column 550 may have a height, width, and depth suitable for containing several sting inverters and one or more combiners. In an example embodiment, column 550 may have a height, length, and width suitable for containing more than 2-24 string inverters, or any other suitable number of string inverters. In various examples, the height, length and width are 10 feet to 20 feet wide, though any suitable width may be used. In various example embodiments, column 550 is at least 10, 15, 18, 20, 22, 25, 30, or 50 feet high, though any suitable height may be used.

In an example embodiment, column 550 is located under the solar panel support structure. Therefore, the string inverters therein are located under the solar panel support structure 510 and are shaded by the solar panel support structure 510 and more particularly by the solar panels 530 during a significant portion of the day light hours. This is in contrast to those installations where the string inverters are just located out in the open, unprotected from the sun's rays. Protecting the string inverters from the sun is a significant advantage to life and performance of the string inverter.

In an example embodiment, a group of string inverters are mounted in a single column. In an example embodiment, more than one string inverter is located in a single column.

For example, 8 string inverters may be grouped in a single column. This grouping of string inverters in a single column has several benefits that are not present where string inverters are not grouped in a single column. For example, it is efficient for electricians to install inverters in a single location as opposed to multiple locations. It is also advantageous for electricians to perform maintenance on electrical components that are located in the same column. In addition, it is advantageous to group the string inverters, in one location because the runs to the combiner, also located in the same column, can be very short compared to runs when the combiner and inverters are not in the same column.

In an example embodiment, more than one string inverter is mounted in a single column, with at least one string inverter above another. Stated another way, at least one string inverter within column 550 is located at an elevation above another string inverter.

In a particular example embodiment, at least one string inverter is located over another string inverter (described herein as a stacked configuration). In this example embodiment, the total footprint for the string inverters in column 550 is smaller than the total footprint for the same number of string inverts laid out in a planar (horizontal), linear (horizontal), or array manner, or in any other orientation that isn't vertically arranged with at least one string inverter located over another. The footprint of a string inverter is represented by a vertical projection of the string inverter (not counting the connecting cables, etc.) on a horizontal plane below the string inverters. Where one string inverter is stacked over the another, the vertical projection will overlap, at least partially, such that the total area of the vertical projections is less than the sum of individual non-overlapping vertical projections. Thus, the area of the footprint of stacked/overlapping string inverters will be smaller than the footprint of a similar number of inverters mounted in a non-stacked orientation. Thus, the solar energy shade structure 500 needs no added space on the ground for inverters, and employs narrow, aesthetically pleasing columns to hide the string inverters.

In addition, the grouping of string inverters in a column is further configured to create a chimney effect, to use natural convection for cooling the string inverters and/or combiners. In an example embodiment, the electronic components generate heat and need that heat to be removed into the surrounding air. If the heat is not removed, the string inverter will start to "de-rate." One example string inverter will start to de-rate at 113° F. and shuts down at 140° F. If the string inverters were fully enclosed without ventilation, or trapped directly under a solid surface, there would be no opportunity for natural convection to cause air flow up through column 550. Although described herein primarily as natural convection, the grouping of several string inverters in a single column makes more practical the ability to employ forced convection of the air through column 550 and over the string inverters, because a single fan would move air past multiple string inverters. In an example embodiment, column 550 has an air passage way inside the outer boundary of column 550, such that air can rise in column 550. In an example embodiment, air can enter at the bottom of column 550, and/or through the front, back, or sides of column 550. In an example embodiment, air can also exit through the top of column 550 and/or through the front, back, or sides of column 550. Thus, in an example embodiment, column 550 may comprise an air inlet located near the bottom of the column and an air exit located near the top of the column, such as a gap, or space or mesh panel or the like, through which air may flow. The opening near the bottom of the column may be screened to protect people and inverters from each other, but to allow air flow through the opening. In an example embodiment, column 550 comprises an opening suitable for allowing air to flow up from the electrical component and out to the environment surrounding column 550.

In this manner, the string inverters have a convenient home, suitable for easy access by maintenance. In an example embodiment, the string inverters are accessible from ground level, on foot, without using any additional ground area. Nevertheless, in this age of moving solar into the community, the string inverters are not unsightly and do not obscure the visual pathways under the structure. In addition, the string inverters and people are protected from each other such that the string inverters are kept inaccessible from human danger and vandalism. Although described herein, in various embodiments, as screening the electrical components, in an example embodiment, the electrical components are not screened, but installed within the column.

Electrical Component within a Brace Frame:

In accordance with various example embodiments, column 550 is a brace-frame. As such, column 550 may be configured to withstand lateral forces. For example, the brace-frame may have a width that is greater than the depth, and the brace-frame may be configured to oppose lateral forces on the solar structure in the direction of the width. In an example embodiment, and with reference again to FIG. 5F, a solar energy shade structure 500 comprises a first brace-frame 550 oriented with its width in an X direction and a second brace-frame 551 oriented with its width in a Y direction (substantially perpendicular to the X direction). Thus, the first brace-frame 550 is configured to better withstand the X direction component of lateral forces and the second brace-frame 551 is configured to better withstand the Y direction component of lateral forces on the solar energy shade structure 500.

In an embodiment and with reference to FIG. 2, FIG. 5A, and FIG. 5B, the vertical support may be configured as a brace-frame 520, with the discussion herein of column 550 being applicable to brace-frame 520. One or more brace-frames 520 may be installed at any locations to support and to restrain modular structure 200. In various embodiments, the dead load of modular structure 200 is isolated from the lateral load of modular structure 200. More specifically, as assembled, modular structure 200 has a unitary construction. As such, the lateral forces exerted on modular structure 200 are translated by the structure to every point on the structure. Therefore, these lateral forces may be counteracted at any point on the structure. This configuration reduces the structural requirements of the vertical supports 220/420 by making use of brace-frame 520 to resist the lateral forces of the modular structure 200. In an embodiment, lateral brace-frames are placed in an x and y orientation on every beam line thereby creating lateral stability. In other embodiments, lateral brace-frames are positioned on fewer than every beam line. For example, center section 311 may be supported above the ground (or other structural surface) by two (2) or more vertical column supports 420 and by two (2) or more lateral force brace-frames 520.

In various embodiments, lateral brace-frames 520 comprise a cladding support 522 and cladding 523. Cladding 523 may be used as signage elements to provide decorative graphics and/or advertising space. Lateral brace-frames 520 may be configured with signage elements that include, for example, backlit signs and electronically controlled signs. With initial reference to FIGS. 5D, 5E, 5I, and 5J, lateral brace-frames 520 can comprise a front cladding support 522a and a rear cladding support 522b. In such configurations, cladding 523 can be secured to one or both of front cladding support 522a and rear cladding support 522b. Further, front cladding and/or rear cladding can comprise a material that permits air flow in and out of the enclosure formed by front cladding support 522a, rear cladding support 522b, and/or cladding 523. In various example embodiments, cladding 523 is made of a material such as: a perforated metal, a mesh or a fabric screen. In one example embodiment, the cladding is a Sunbrella® fabric. Thus, cladding 523 may be configured to permit air to flow through it. Moreover, the fabric may be suitable for silk screening or printing advertising/signage on the fabric.

In various embodiments, one or more side enclosure panels 528 can be positioned adjacent to and between front cladding support 522a and rear cladding support 522b. Side enclosure panels 528 can, along with cladding 523, form an enclosure of electrical component 560. In various embodiments, side enclosure panel 528 and/or cladding support (522a/522b) can comprise a door having a latch and one or more hinges. Moreover, the door may comprise any suitable attachment mechanism that is configured to secure the door in a closed position, such as, for example, screws, bolts, wire, chains, etc., and facilitate access to the electrical component 560 behind the door.

Further, side enclosure panel 528 and/or cladding support (522a/522b) can comprise a material that permits air flow in and out of the enclosure formed by side enclosure panel 528 and/or cladding 523. For example, side enclosure panel 528 and/or cladding support (522a/522b) can comprise at least one of a perforated metal, a metal mesh, and a woven fabric. Side enclosure panel 528 and/or cladding support (522a/522b) can also comprise a vented material, such as a solid, continuous metal or plastic material into which vents are formed.

With initial reference to FIG. 5C, lateral brace-frame 520 can further comprise an electrical component mounting frame 524. In various embodiments, electrical component mounting frame 524 can comprise a frame, such as a metal frame, that is coupled to main column member 521 and configured to support an electrical component 560. The electrical component mounting frame can be angle iron, channel, a sheet of metal, or any other structure useful for mounting an electrical component. In one example, electrical component 560 is coupled to electrical component mounting frame 524. In another example embodiment, the electrical component is mounted directly to the main column member. In various embodiments, electrical component 560 can comprise string inverter 531 or a combiner.

Electrical component 560 can, for example, be enclosed within the enclosure formed by side enclosure panel(s) 528 and/or cladding 523. By forming side enclosure panel(s) 528 and/or cladding 523 from a perforated, vented, woven, or otherwise discontinuous material, air flow is allowed to pass into and out of the enclosure, allowing for heat dissipation from electrical components 560. Although described as an "enclosure," the space defined by side enclosure panel(s) 528 and/or cladding 523 can comprise an open ended space as well. For example, side enclosure panel(s) 528 and/or cladding 523 can define a space that is open on the top and/or bottom, and/or partially open on the sides. In various embodiments, side enclosure panel(s) 528 and cladding 523 form an enclosure having a "chimney" configuration, in which heat is dissipated upwards from electrical components 560 and exits the open top of the enclosure.

As discussed above, side enclosure panel(s) 528 and/or cladding 523 can hide electrical component 560 (such as, for example, string inverters and/or combiner panels coupled to electrical component mounting frame 524) from view.

Side enclosure panel 528 can have, for example, the same height as one or more cladding 523. In other embodiments, side enclosure panel 528 can comprise a height less than the height of claddings 523. For example, side enclosure panel 528 can comprise sufficient height to protect one or more electrical components from access by the public. Further, multiple front cladding or rear cladding 523 can be used on a single face of brace-frame 520. For example, front cladding 523 may be segmented into multiple sections to allow for easier opening or removal of the front cladding 523 sections, and consequently, easier access to electrical components 560. However, any configuration of side enclosure panels 528 and front/rear cladding 523 is within the scope of the present disclosure. It is noted that comments made herein in connection with brace-frame 520 may be equally applicable to column 550, and vice versa. Moreover, in one example embodiment, the SPHS may be constructed with a column 550 that is not structurally required for lateral support, but merely to house electrical component 560.

Figure 6A:
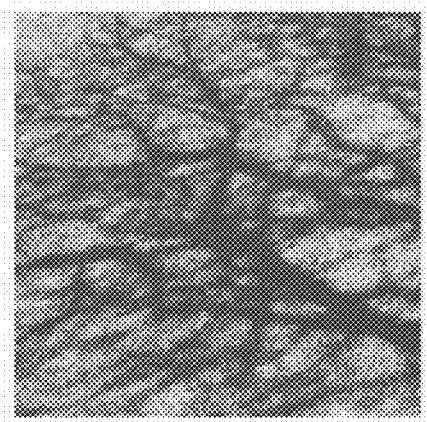
FIG. 6A-FIG. 6D illustrate an example method of creating the spacing of the shade panels from a pattern yielded from the process of pixilation of photographs of the shade profile of a tree.
Figure 6C:
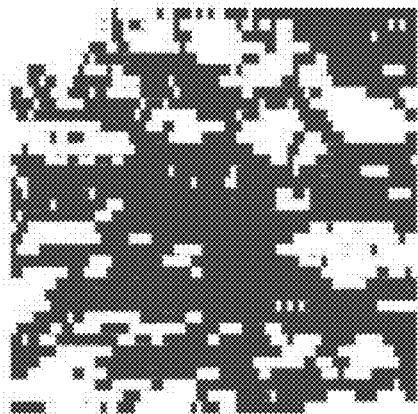
Figure 6B:
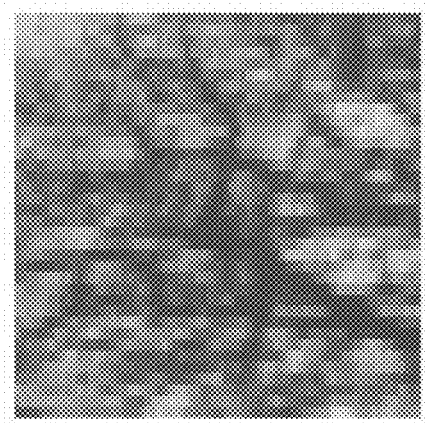
Figure 6D:
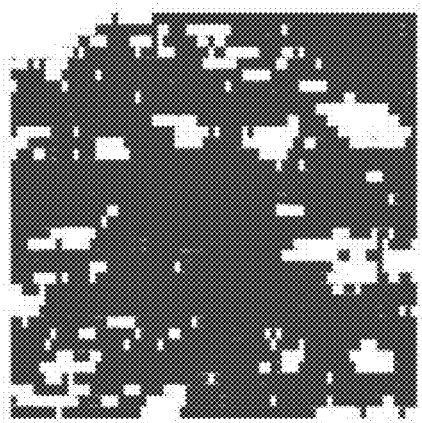

In an exemplary embodiment and with reference to FIG. 4 and FIGS. 6A through 6C, solar collection panels 430 and shade panels 440 may be arranged to simulate a natural environment. Moreover, FIGS. 6A through 6D show an exemplary process for laying out solar panels in SPHS 410. For example and with reference to FIG. 6A, the shadow of a tree branch may be photographed. That photograph may be pixilated to create an approximation of the tree shadow. This approximation of the tree shadow can further be adjusted, as shown in FIG. 6C and FIG. 6D, to achieve the desired shade coverage and power output. Adjustments may be made based on a variety of factors. For example: (1) solar collection panels 430 may be added to increase the overall power generation of modular structure 400; (2) solar collection panels 430 and shade panels 440 may be removed to decrease the weight of modular structure 400; (3) solar collection panels 430 and shade panels 440 may be removed to decrease the effect of lift or shearing force on modular structure 400; (4) solar collection panels 430 and shade panels 440 may be removed to increase the amount of light that reaches vegetation or structures under modular structure 400; and/or (5) solar collection panels 430 and shade panels 440 may be added or removed to achieve a desired lighting effect (e.g. dappling or stippling of light) under modular structure 400. Although the dappling pattern may be based off of a photograph, any suitable method of arriving at the pattern of solar panels and/or shade panels can be used.

Figure 7A:
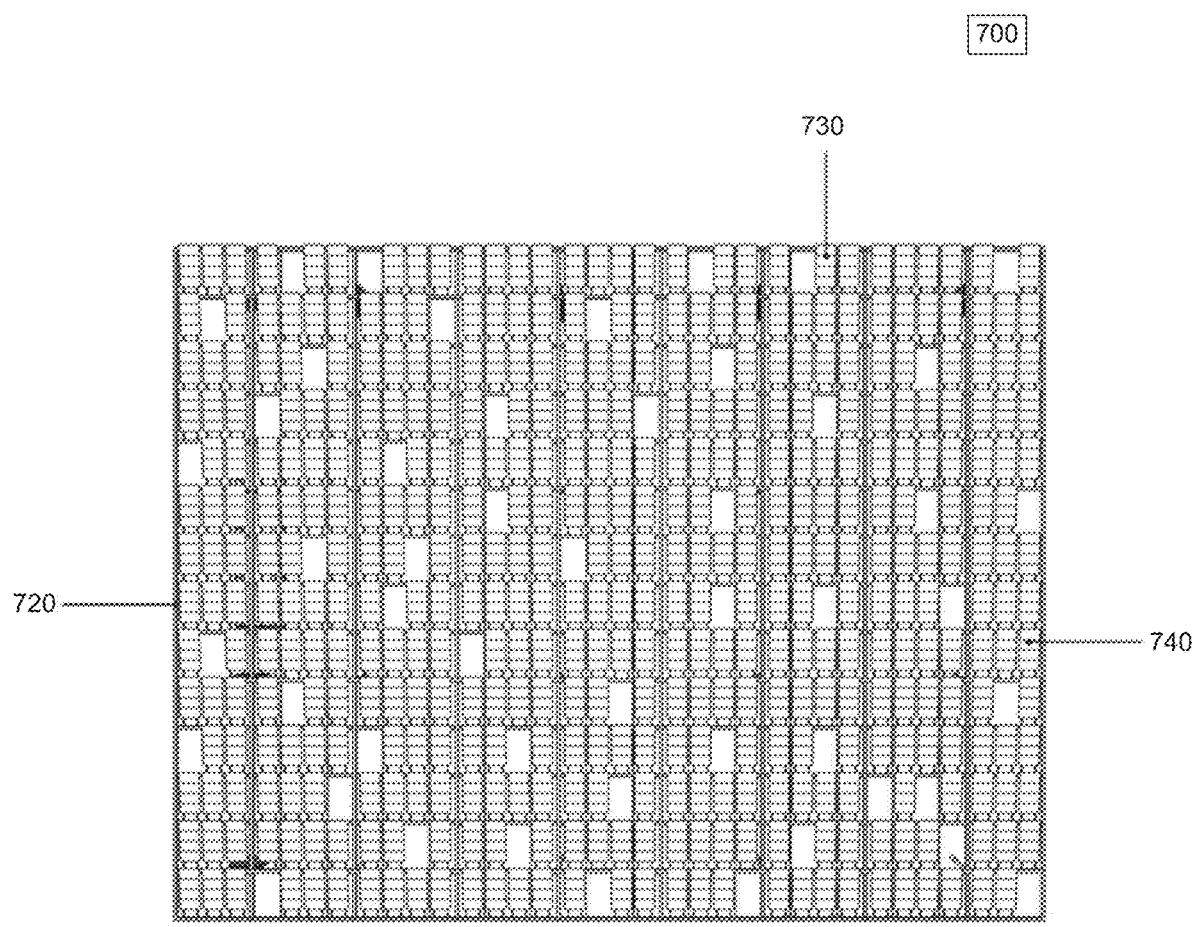
FIG. 7A illustrates a top view of an example modular structure loaded with solar panels in accordance with the design plan.
Figure 7B:
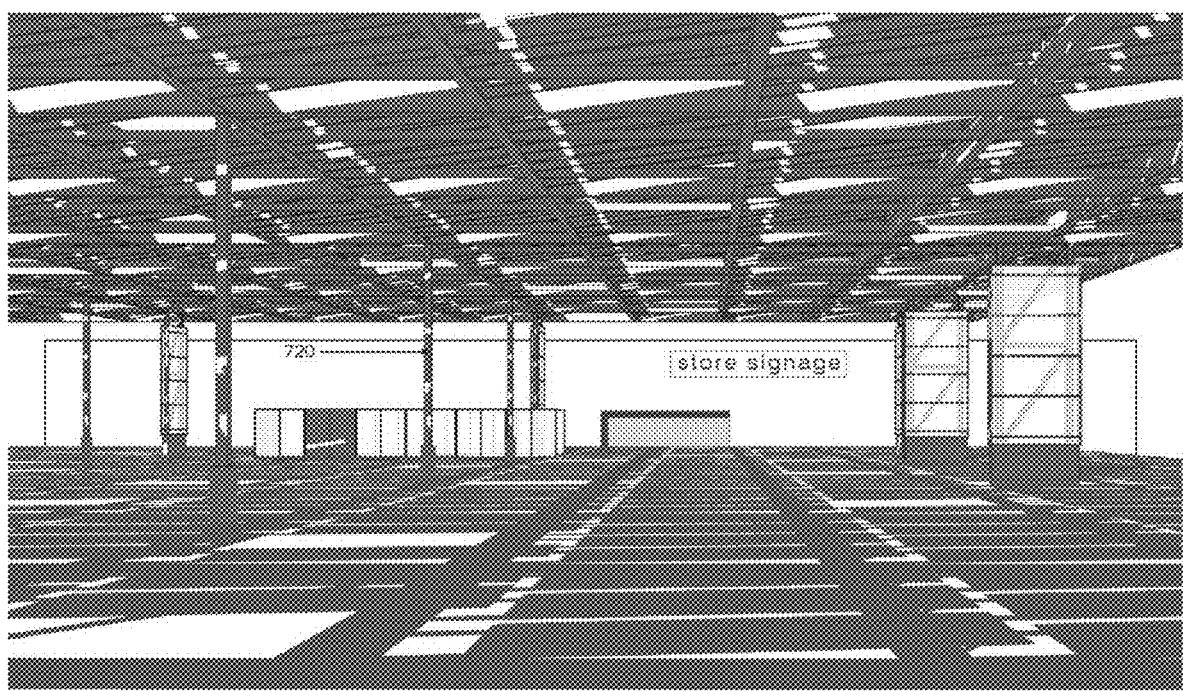
FIG. 7B illustrates a perspective bottom view of an example modular structure loaded with solar panels in accordance with the design plan to provide dappled light and installed in front of a store front.

In an embodiment and with reference to FIG. 7A and FIG. 7B, solar collection panels 730 and shade panels 740 may be arranged in any suitable way to achieve a desired environmental effect. Similarly, the spacing between panels in SPHS 720, the ability to achieve customizable lighting arrangements, and the increased height of modular structure 700 provide a more pleasing experience for a user under the structure.

In an embodiment, the increased height of SPHS 720, due to the vertical supports, also provides greater visibility underneath the shade structure. For example, where modular structure 700 is installed over a parking lot in front of a store, the user of the parking lot is able to see the store front from beneath the modular structure 700. Conventional shade structures over parking lots are generally low enough that they at least partially obstruct the view of the store front from the parking lot. This visibility of the store front is useful in advertising and/or promoting the store. This visibility is also useful for the consumer to maintain their bearings and/or find the store the consumer is looking for. In an exemplary embodiment, the enhanced visibility, the openness of the space underneath modular structure 700, and/or the security cameras provide an environment of enhanced safety for the people under the structure. These features are also more likely to have a deterrent effect on theft, assault, vandalism, and other crime or mischief.

In an embodiment, installation of modular structure 100 may be used to generate revenue and offset the cost of producing solar energy. For example, signage may be attached to modular structure 100 in various locations. Signage may include advertising, information signs, and the like. Signage may be electronic media or printed in any fashion. In the form of advertising, revenue from the signage may be used to reduce or offset the cost of solar energy produced. In an embodiment, modular structure 100 is configured to provide shade. This shade may also be used to offset or reduce the cost of solar energy produced. For example, where modular structure 100 is installed over a parking lot, the parking lot owner may charge a fee to park in a shaded space. At least a portion of the revenue generated by the parking fees may be used to offset the cost of the solar energy produced. In an embodiment, modular structure 100 may be installed at a location as a result of donations. For example, modular structure 100 may be installed on a school campus, museum, zoo or similar location. Supporters of the location or associated organization may be given the opportunity to buy solar panels or donate toward the cost of solar panels or modular structure 100 construction. At least a portion of the revenue from the donations may be used to offset the cost of the solar energy produced. Given the height and size of the structure, revenue may also be generated by allowing antennas to be installed on the structure, by charging fees for using the space under the structure, by charging fees for locating electric car charging stations under the structure and/or the like. At least a portion of the revenue may be used to offset the cost of generating solar energy.

In an embodiment, a method of designing a solar structure may comprise capturing a shade profile of a natural element as a photograph; pixilating the photograph; adjusting a contrast ratio of the pixilated photograph based on a set of predetermined factors to achieve a design plan; and designing an arrangement of a plurality of solar collection panels to correspond to the design plan. In one embodiment, the plurality of solar collection panels may be installed on a structure in accordance with the design plan in a public area. In an embodiment, the predetermined factors include at least one of lifting force load, shearing force load, desired lighting effects, and weight requirements.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In an example embodiment, a solar energy shade structure, comprises: a structure installed over a public area and configured to support and retain a plurality of solar panels, wherein the structure further comprises a plurality of vertical supports; wherein the majority of the plurality of solar panels are supported by the structure at an angle of approximately 5 degrees to approximately 15 degrees from level, and wherein the plurality of solar panels are spaced apart such that natural light is permitted to pass through the structure.

In a further example embodiment, each of the vertical supports is sufficiently long to support the horizontal portion of the structure at least 18 feet above a surface of the public area.

In a further example embodiment, the solar energy shade structure further comprises electricity conditioning equipment, wherein the electricity conditioning equipment is positioned under the structure such that they are cooled and protected by the shade.

In a further example embodiment, the structure is configured to support a non-energy producing element; wherein the non-energy producing element is at least one of a sign, an antenna, an information system, a television, an interactive, an electric car charging apparatus, and a security camera.

In an example embodiment, a solar panel system comprises: a center structure having a generally rectangular shape having a first length and a first width; a first plurality of solar panels attached to the center structure and retained by the center structure at an angle of approximately 5 degrees to approximately 15 degrees from level; a first support structure fixedly attached to a first corner of the center structure, wherein the first support structure has a length sufficient to support the center structure at least 18 feet above the surface of a public area; a side structure comprising a generally rectangular shape having a second length and a second width and coupled to the center structure in a cantilevered configuration, wherein the first length of the center structure corresponds to the second length of the side structure; and a corner structure comprising a generally rectangular shape have a third length and a third width and coupled to the side structure in a cantilevered configuration, wherein the second width of the side structure corresponds to the third width of the corner structure.

In a further example embodiment, the center structure provides a dappled shade effect when subjected to sunlight, and the desired lighting profile is an approximation of a shade profile of a natural element.

In a further example embodiment, the solar panel system is further configured to be maintained by a method, comprising: providing the solar panel system over a surface of a public area, wherein the solar panel system further comprises a top side facing the sun and an opposing bottom side, and wherein the plurality of solar panels are installed on the top side, and wherein the plurality of solar panels are accessible from the bottom side of the solar structure; accessing a retaining mechanism (for example, a screw(s), a bolt(s), a latch(es), etc.) from the bottom side, wherein the retaining mechanism is configured to attach the solar panel to the solar panel holding structure; disconnecting the solar panel from the solar panel holding structure by manipulating the retaining mechanism; and removing the solar panel from the solar panel holding structure through the bottom side.

In a further example embodiment, the solar energy shade structure is configured for installation over an existing parking lot, is configured for installation over trees, and is configured such that the structure, with the exception of one or more vertical supports of the structure, does not obstruct a pedestrian's view of store front signage proximate to the structure.

In a further example embodiment, a solar structure is configured to provide a dappled light pattern beneath the solar structure, wherein the dappled light pattern is an approximation of a natural element.

When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A force lateral brace-frame for supporting a solar panel holding structure comprising:
   a first height in a direction parallel to a vertical direction, a first long axis parallel to an X direction and perpendicular to the vertical direction, a first width along the first long axis, and a first thickness parallel to a Y direction, wherein the Y direction is perpendicular to both the vertical direction and the X direction, wherein the first width is greater than the first thickness, the force lateral brace-frame for counteracting lateral forces parallel to the X direction to create lateral stability,
   wherein the force lateral brace-frame further comprises:
      a first vertical support of the force lateral brace-frame,
      a second vertical support spaced apart from the first vertical support,
      a front cladding support coupled to the first vertical support and the second vertical support,
      a rear cladding support coupled to the first vertical support and the second vertical support,
      a first cladding coupled to the front cladding support and a second cladding coupled to the rear cladding support,
      a first side enclosure panel adjacent to and positioned between the front cladding support and the rear cladding support,
      a second side enclosure panel adjacent to and positioned between the front cladding support and the rear cladding support and positioned opposite the first side enclosure panel, and
      an electrical component disposed between the first vertical support and the second vertical support, and the electrical component disposed between the first side enclosure panel and the second side enclosure panel.

2. The force lateral brace-frame of claim 1, wherein the first cladding comprises a perforated metal, a metal mesh, or a woven fabric, and further comprising an attachment mechanism for at least one of the front cladding support and the rear cladding support, the attachment mechanism configured for lockably accessing the electrical component.

3. The force lateral brace-frame of claim 1, further comprising a component mounting frame for mounting the electrical component to the force lateral brace-frame, wherein the component mounting frame is disposed between the first vertical support and the second vertical support.

4. The force lateral brace-frame of claim 1, wherein the electrical component is a string inverter.

5. The force lateral brace-frame of claim 1, further comprising an opening in the force lateral brace-frame suitable for allowing air to flow up from the electrical component and out to an environment surrounding the force lateral brace-frame.

6. The force lateral brace-frame of claim 1, further comprising a top opening for allowing air to pass from an interior portion of the force lateral brace-frame, wherein the interior portion is at least partially located between the first side enclosure panel, the second side enclosure panel, the first cladding and the second cladding.

7. The force lateral brace-frame of claim 1, wherein the force lateral brace-frame has a width, a depth, a height, and a space within the force lateral brace-frame, wherein the electrical component is mounted to the force lateral brace-frame by locating the electrical component within the space within the force lateral brace-frame.

8. The force lateral brace-frame of claim 1, wherein the electrical component is mounted to the force lateral brace-frame and configured to be screened from view by at least one of a sign, a lighting element, a decorative panel, and an advertising panel.

9. The force lateral brace-frame of claim 1, wherein the electrical component is screened from view with a panel comprising a breathable mesh cloth.

10. The force lateral brace-frame of claim 1, wherein the electrical component is mounted to the force lateral brace-frame by locating the electrical component within an outermost portion of the force lateral brace-frame.

* * * * *